(12) United States Patent
Wu et al.

(10) Patent No.: US 8,566,404 B2
(45) Date of Patent: Oct. 22, 2013

(54) INSTANT MESSAGING SYSTEM AND METHOD

(75) Inventors: Xiaoguang Wu, Shenzhen (CN); Yang Chen, Shenzhen (CN); Yejun Huang, Shenzhen (CN); Huateng Ma, Shenzhen (CN); Liqing Zeng, Shenzhen (CN)

(73) Assignee: Tencent (BVI) Limited, Road Town (VG)

( * ) Notice: Subject to any disclaimer, the term of this patent is extended or adjusted under 35 U.S.C. 154(b) by 0 days.

(21) Appl. No.: 12/414,510

(22) Filed: Mar. 30, 2009

(65) Prior Publication Data

US 2009/0182808 A1 Jul. 16, 2009

Related U.S. Application Data

(62) Division of application No. 10/473,010, filed as application No. PCT/US01/45050 on Nov. 14, 2001, now Pat. No. 7,512,407.

(30) Foreign Application Priority Data

Mar. 26, 2001 (CN) .............................. 01 2 183016
Sep. 13, 2001 (CN) .............................. 01 1 278471

(51) Int. Cl.
  *G06F 15/16* (2006.01)
  *G06F 3/00* (2006.01)
(52) U.S. Cl.
  USPC ........................... 709/206; 709/207; 715/751
(58) Field of Classification Search
  USPC ........................... 709/204–207; 715/733–759
  See application file for complete search history.

(56) References Cited

U.S. PATENT DOCUMENTS

| 5,796,393 A | 8/1998 | MacNaughton et al. |
| 5,797,096 A | 8/1998 | Lupien et al. |
| 5,983,262 A | 11/1999 | Kukkal |
| 6,020,884 A | 2/2000 | MacNaughton et al. |

(Continued)

FOREIGN PATENT DOCUMENTS

| CN | 1260094 A | 7/2000 |
| CN | 1267415 A | 9/2000 |

(Continued)

OTHER PUBLICATIONS

Office Action issued by the United States Patent and Trademark Office in related U.S. Appl. No. 12/414,523, mailed on Jul. 20, 2011.

(Continued)

*Primary Examiner* — Boris Gorney
(74) *Attorney, Agent, or Firm* — Jones Day

(57) ABSTRACT

Methods and apparatuses for processing an instant message from a source wireless communication device to a destination device are described herein. In one aspect of the invention, an exemplary method includes receiving the instant message from the source wireless communication device, the instant message having a source wireless communication identifier, a destination instant messenger identifier, and data contents; extracting the source wireless communication identifier, the destination instant messenger identifier and the data contents from the instant message; retrieving a source instant messenger identifier corresponding to the source wireless communication identifier; binding the source instant messenger identifier with the source wireless communication identifier; and transmitting the data contents with the source instant messenger identifier to the destination device over a communication network, based on the destination instant messenger identifier. Other methods and apparatuses are also described.

4 Claims, 33 Drawing Sheets

(56) References Cited

U.S. PATENT DOCUMENTS

| | | | |
|---|---|---|---|
| 6,049,812 A | 4/2000 | Bertram et al. | |
| 6,085,100 A | 7/2000 | Tarnanen | |
| 6,128,489 A | 10/2000 | Seazholtz et al. | |
| 6,134,544 A | 10/2000 | Glitho et al. | |
| 6,177,936 B1 | 1/2001 | Cragun | |
| 6,178,433 B1 | 1/2001 | Nakamura et al. | |
| 6,212,550 B1 | 4/2001 | Segur | |
| 6,223,059 B1 | 4/2001 | Haestrup | |
| 6,714,793 B1 * | 3/2004 | Carey et al. | 455/466 |
| 6,757,365 B1 * | 6/2004 | Bogard | 379/88.17 |
| 6,851,060 B1 | 2/2005 | Shrader | |
| 6,941,345 B1 * | 9/2005 | Kapil et al. | 709/206 |
| 6,954,728 B1 * | 10/2005 | Kusumoto et al. | 705/14.4 |
| 7,058,036 B1 | 6/2006 | Yu et al. | |
| 7,149,982 B1 | 12/2006 | Duperrouzel et al. | |
| 7,392,306 B1 | 6/2008 | Donner et al. | |
| 7,890,856 B2 | 2/2011 | Chiang | |
| 2002/0035605 A1 * | 3/2002 | McDowell et al. | 709/206 |
| 2002/0130904 A1 * | 9/2002 | Becker et al. | 345/753 |
| 2002/0135538 A1 | 9/2002 | Rosen | |
| 2004/0117443 A1 | 6/2004 | Barsness | |
| 2005/0091327 A1 * | 4/2005 | Koch | 709/206 |

FOREIGN PATENT DOCUMENTS

| | | |
|---|---|---|
| CN | 1278383 A | 12/2000 |
| CN | 1281187 A | 1/2001 |
| WO | WO 98/57482 | 12/1998 |
| WO | WO 99/09708 | 2/1999 |
| WO | WO 99/22557 | 5/1999 |

OTHER PUBLICATIONS

Office Action issued by the United States Patent and Trademark Office in related U.S. Appl. No. 12/414,517, mailed on Sep. 27, 2011.
Notice of Allowance and Fee(s) Due issued by the U.S. Patent and Trademark Office in related U.S. Appl. No. 12/401,435, mailed Oct. 7, 2011.
Notice of Allowance and Fee(s) Due issued by the U.S. Patent and Trademark Office in related U.S. Appl. No. 12/414,505, mailed Oct. 7, 2011.
United States Patent and Trademark Office, Office Action issued in related U.S. Appl. No. 12/414,517, mailed on Sep. 27, 2011.
United States Patent and Trademark Office, Notice of Allowance and Fee(s) Due issued in related U.S. Appl. No. 12/414,505, mailed Oct. 7, 2011.
NETEASE, Control Engineering China magazine, vol. 4, 2000, pp. 53-55.
Software Explore, Control Engineering China magazine, vol. 11, 2000, pp. 54-56.
China Patent and Trademark Office, Office Action issued in related Application No. CN 200510109480.6, mailed Aug. 17, 2007.
China Patent and Trademark Office, Office Action issued in related Application No. CN 200510109480.6, mailed Jan. 25, 2008.
Patent Cooperation Treaty, International Search Report issued in related Application PCT/US01/45050, mailed Jun. 4, 2002.
Patent Cooperation Treaty, International Preliminary Examination Report issued in related Application PCT/US01/45050, completed Sep. 29, 2002.
United States Patent and Trademark Office, Notice of Allowance and Fee(s) Due issued in related U.S. Appl. No. 12/401,435, mailed Oct. 7, 2011.
Office Action issued by the United States Patent and Trademark Office in related U.S. Appl. No. 12/414,523, mailed on Jan. 31, 2012.
Notice of Allowance issued by the United States Patent and Trademark Office in related U.S. Appl. No. 12/401,435, mailed on Jan. 24, 2012.
Notice of Allowance issued by the United States Patent and Trademark Office in related U.S. Appl. No. 12/414,505, mailed on Feb. 2, 2012.
Office Action issued by the United States Patent and Trademark Office in related U.S. Appl. No. 12/414,517, mailed on May 1, 2012.
Office Action issued by the United States Patent and Trademark Office in related U.S. Appl. No. 12/414,523, mailed on Aug. 9, 2012.
Notice of Allowance issued by the United States Patent and Trademark Office in related U.S. Appl. No. 12/414,523, mailed on Jan. 4, 2013.
Notice of Allowance and Fee(s) Due, issued by the United States Patent and Trademark Office in related U.S. Appl. No. 12/414,517, mailed on Jun. 13, 2013.

* cited by examiner

INSTANT MESSAGING SYSTEM AND METHOD

This application is a divisional of U.S. application Ser. No. 10/473,010, which is a national stage application of PCT/US01/45050, filed Nov. 14 2001, and claiming priority to Chinese Patent Application No. 012183016, filed Mar. 26, 2001, and Chinese Patent Application No. 011278471, filed Sep. 13, 2001. U.S. patent application Ser. No. 10/473,010 is incorporated by referenced herein for all purposes.

FIELD OF THE INVENTION

The present invention relates generally to the technology of Internet instant messaging and mobile network short messaging.

BACKGROUND OF THE INVENTION

Internet Instant messaging (IM) is a near real-time messaging service on the Internet. IM application tools have found wide applications on the Internet. Within an instant messaging system, an Instant Messenger ID is a unique identifier for a participant or user associated with an Instant Messenger client application. Short Message Service (SMS) is a technology that allows simple text messages to be communicated between mobile telephones. Due to limitations of existing related applications technology and insufficient combination with Internet applications, an open message exchange between the Internet and mobile telephone networks is absent.

A conventional browser can only display a Web page at a time. In order to display multiple Web pages, multiple instances of the browser have to be launched. As a result, excessive system resources are involved and excessive time will be used to initialize the extra instances of the browsers.

SUMMARY OF THE INVENTION

According to one embodiment of the invention, a method for processing an instant message from a source wireless communication device to a destination device includes receiving the instant message from the source wireless communication device, the instant message having a source wireless communication identifier, a destination instant messenger identifier, and data contents; extracting the source wireless communication identifier, the destination instant messenger identifier, and the data contents from the instant message; identifying a source instant messenger identifier associated with the source wireless communication identifier; and transmitting the data contents with the source instant messenger identifier to the destination device over a communication network, based on the destination instant messenger identifier.

In another aspect of the present invention, a method of binding an instant messenger identifier with a wireless communication ID of a wireless communication device includes receiving a binding request from the wireless communication device, the binding request including the wireless communication identifier; generating an instant messenger identifier corresponding to the wireless communication identifier; storing the instant messenger identifier and the wireless communication identifier in a database, wherein the first instant messenger identifier is associated with the wireless communication identifier; and performing related services of the binding request based on the instant messenger identifier.

In yet another aspect of the present invention, a method of displaying a status message of an instant messenger subscriber includes receiving a status request querying a status of a first instant messenger (IM) subscriber from a second IM subscriber, the status request including an instant messenger identifier of the first IM subscriber; retrieving the status of the first IM subscriber, based on the instant messenger identifier of the first IM subscriber; displaying the status of the first IM subscriber on a display device of the second IM subscriber; and causing a presence indicator corresponding to the first IM subscribe to be displayed, the presence indicator sufficiently representing a characteristic of the first IM subscriber.

In further yet another aspect of the present invention, a method of displaying multiple Web pages within a single instance of a browser includes requesting identification of a plurality of Web pages from a user; receiving the plurality of the Web pages information items from corresponding Web servers based on the identification of the plurality of Web pages; and displaying the plurality of the Web pages within a common instance of the browser, each of the plurality of the Web pages displayed corresponding to a page selector.

The present invention includes apparatuses that perform these methods, including data processing systems, which perform these methods, and machine-readable media which when executed on a data processing system, causes the system to perform these methods. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

One aspect of the present invention relates an instant messenger (or messaging) (IM) system between a wireless communication device and a non-wireless communication device, or between a wireless communication device and another wireless communication device. A further aspect of the present invention also introduces a unique Internet browser that can display multiple Web pages in a single browser window. The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

Figure 1:
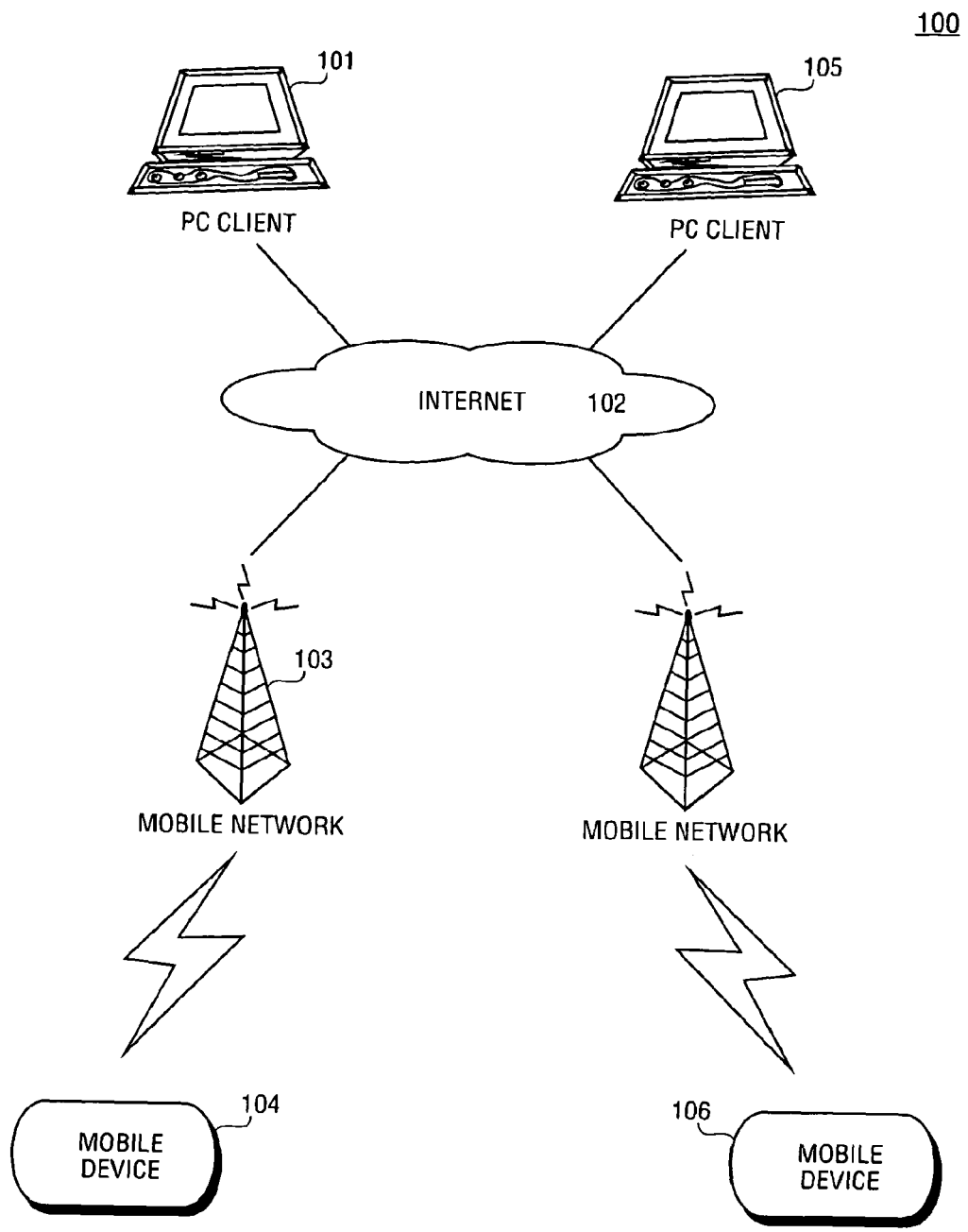
FIG. 1 shows a block diagram of a mobile to PC, mobile to mobile, and PC-to-PC communication system, according to one embodiment of the present invention.

FIG. 1 shows a block diagram of an exemplary environment 100 in which the present invention may be deployed. The environment 100 typically includes a non-wireless client, such as personal computer (PC) client 101, connected to the Internet 102 through a network interface. The Internet 102 is a global network of computers constantly connected to each other using standardized communications protocols (e.g., TCP/IP protocol). A network interface to the Internet may be through a dialup network connection provided by an Internet service provider (ISP), such as American Online (AOL), or Microsoft Network (MSN). Alternatively, a PC may connect to the Internet through a broadband Internet connection, such as cable modem or digital subscription line (DSL). The environment 100 also includes a wireless client such as mobile (e.g., cellular) phone 104 connected through a wireless network 103. The present invention provides instant messenger services between the PC clients 101 and 105, mobile clients 104 and 106, as well as between PC client 101 and mobile client 104. In one embodiment, the mobile client 104 may be a cellular phone. In other embodiments, the mobile client 104 may be a personal digital assistant (PDA), a laptop (or notebook) computer, pager, or an portable electronic device capable of wireless communications.

Figure 2:
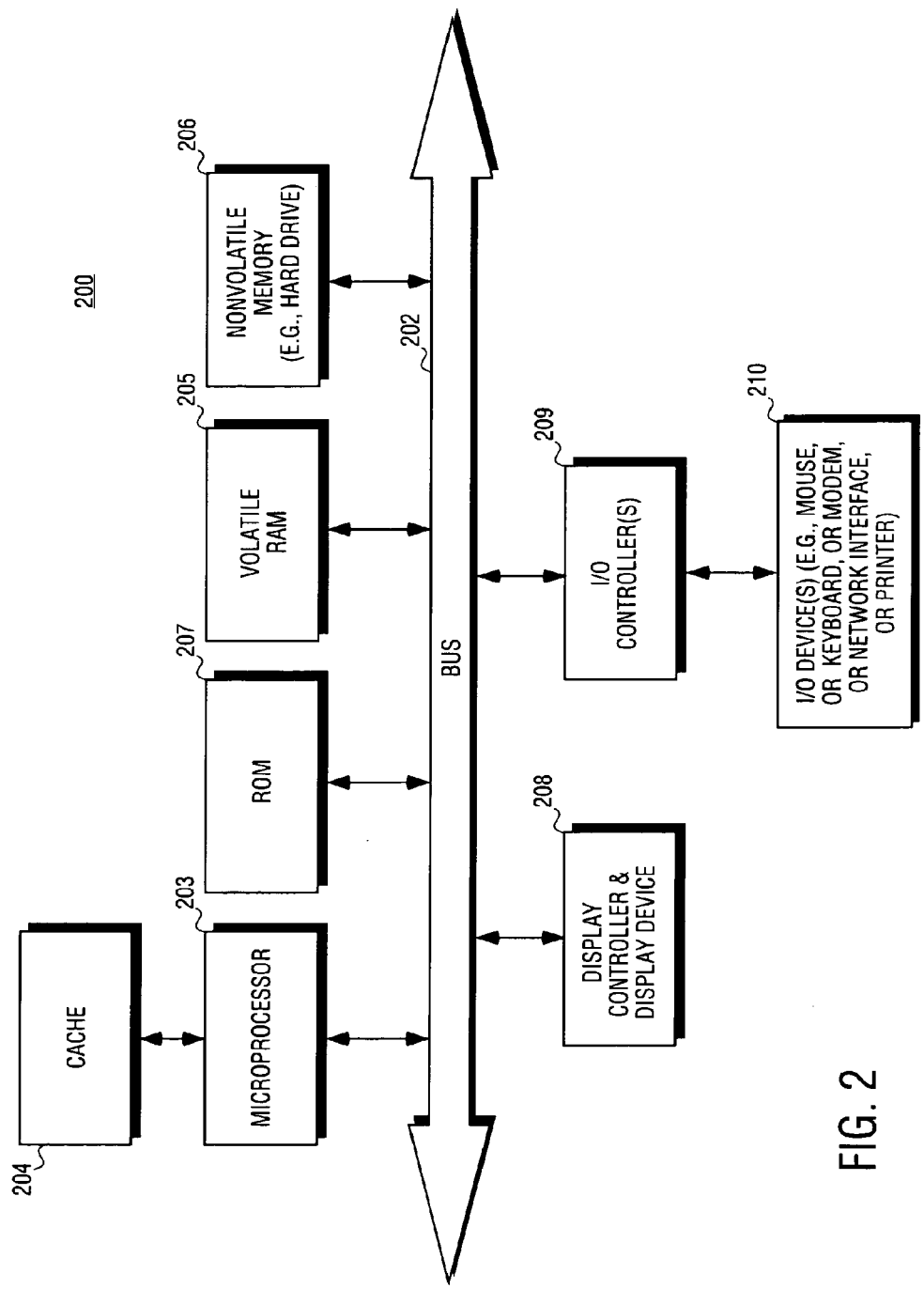
FIG. 2 shows a computer system that may be used with present invention.

FIG. 2 shows one example of a computer system that may be used with the present invention. Note that while FIG. 2 illustrates various components of a computer system, it is not intended to represent any particular architecture or manner of interconnecting the components, as such details are not germane to the present invention. It will also be appreciated that network computers and other data processing systems, which have fewer components or perhaps more components, may also be used with the present invention. The computer system of FIG. 2 may, for example, be an Apple Macintosh or an IBM compatible computer.

As shown in FIG. 2, the computer system 200, which is a form of a data processing system, includes a bus 202 that is coupled to a microprocessor 203 and a ROM 207 and volatile RAM 205 and a non-volatile memory 206. The microprocessor 203, which may be a Pentium microprocessor from Intel Corporation, is coupled to cache memory 204 as shown in the example of FIG. 2. The bus 202 interconnects these various components together and also interconnects these components 203, 207, 205, and 206 to a display controller and display device 208 and to peripheral devices such as input/output (I/O) devices, which may be mice, keyboards, modems, network interfaces, printers and other devices which are well known in the art. Typically, the input/output devices 210 are coupled to the system through input/output controllers 209. The volatile RAM 205 is typically implemented as dynamic RAM (DRAM) that requires power continuously in order to refresh or maintain the data in the memory. The non-volatile memory 206 is typically a magnetic hard drive, a magnetic optical drive, an optical drive, a DVD RAM, or other type of memory system that maintains data even after power is removed from the system. Typically, the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

The non-volatile memory 206 is an exemplary a machine-readable medium on which is stored a set of instructions (i.e., software) embodying any one, or all, of the methodologies described herein. The software may also reside, completely or at least partially, within the volatile memory 205 and/or within the processor 203. The software may further be transmitted or received via the network interface device. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Figure 3:
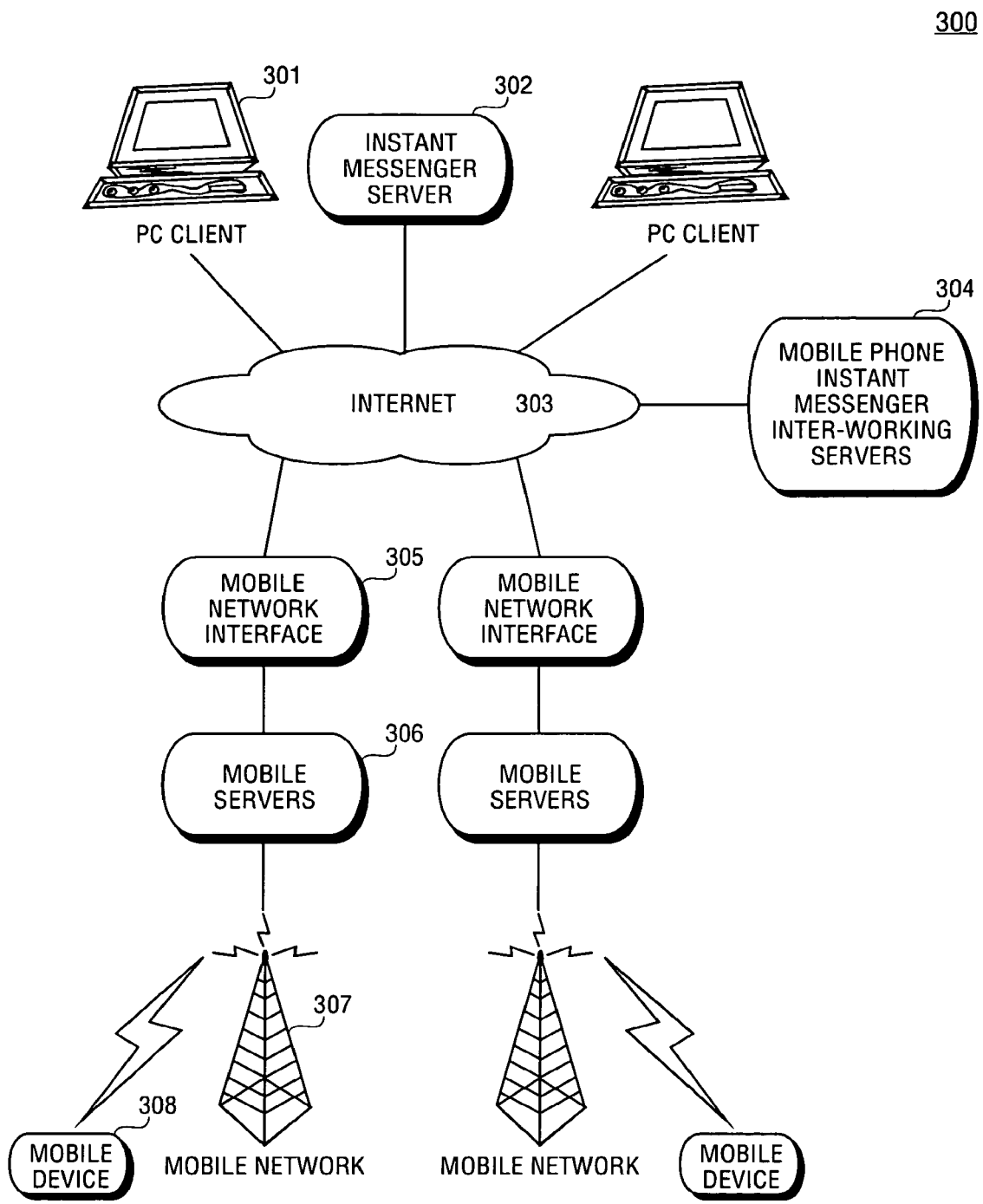
FIG. 3 shows a block diagram of another embodiment of the invention.

FIG. 3 shows a block diagram of a communications system 300, according to an exemplary embodiment of the present invention. Referring to FIG. 3, the system 300 includes at least one PC client 301 connected to the Internet 303, an instant messenger (IM) server 302, and a mobile phone instant messenger inter-working server 304, a mobile network interface 305, a mobile server 306, a wireless network 307 and a mobile client 308. The PC client 301 is connected to the Internet 303 through either an ISP or directly connected through an Ethernet. The IM server 302 is responsible for managing instant messenger identifiers (ID) for all clients including PC client 301 and mobile client 308. When a mobile client 308 sends an instant message to the PC client 301, the message is received by the mobile server 306 through the wireless network 307, such as a ground-based wireless or satellite network. The mobile server 306 processes the data and identifies the data that is for the instant messenger message. In one embodiment, the instant message may be Short Message Service (SMS) compatible. The mobile server 306, then transmits the message through the mobile network interface 305 and Internet 303 to the mobile phone instant messenger inter-working server (MPIMIS) 304. The MPIMIS 304 identifies the source of the message (e.g., mobile phone 308) and the destination such as PC client 301. The MPIMIS 304 invokes the IM server 302 to identify the destination based on the instant messenger ID of the destination. The IM server 302 then receives the message from the MPIMIS 304 and transmits the message to the PC client 301. The instant messenger processing from PC client 301 to mobile client 308 goes in reversed order.

Figure 4:
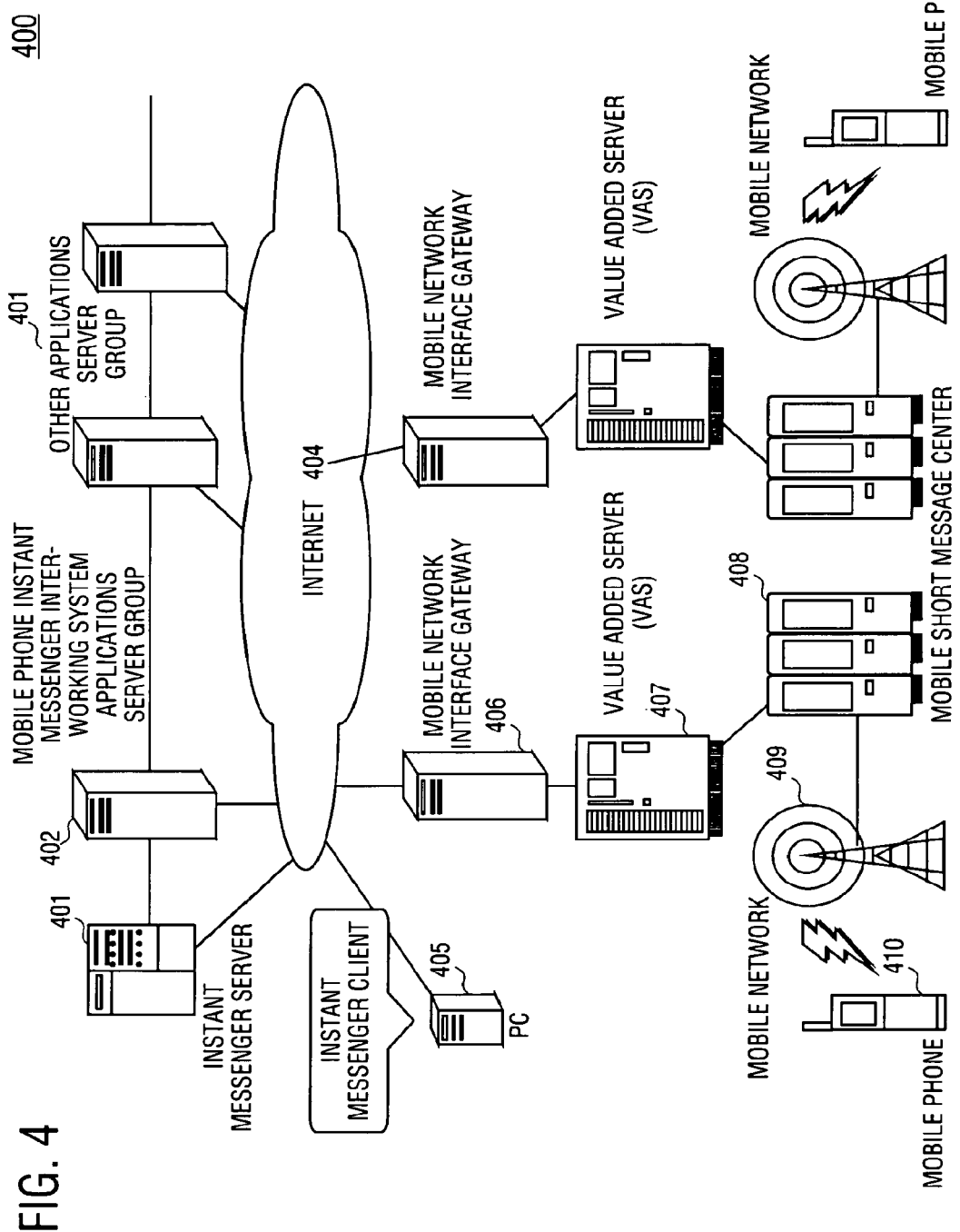
FIG. 4 shows yet another embodiment of the present invention.

FIG. 4 shows a block diagram of another exemplary embodiment of a communications system 400 according to the present invention. Referring to FIG. 4, the system 400 includes an instant message (IM) server 401 coupled to the Internet 404. The IM server 401 is responsible for transferring messages in an Internet instant messenger system from a PC to a mobile phone, from a mobile phone to a PC, and from a PC to a PC. A PC instant messenger client 405 (e.g., executing on a PC) transfers and receives a message to and from a mobile client 410 through the IM server 401. The mobile phone instant messenger inter-working server (MPIMIS) 402, coupled to the Internet, is responsible for binding an instant messenger ID and a mobile phone number. Typically, the MPIMIS 402 allocates instant messenger IDs from the IM server 401 and establishes a message-mapping relation with mobile phone numbers, and enables message exchange between mobile phones and PCs under ID binding conditions. Thus a PC client 405 communicates with a mobile client 410 through an instant messenger ID of the mobile client, instead of the mobile client's phone number. The phone number of a mobile client 410 is bound with a unique instant messenger ID. Thus, when a mobile client 410 communicates with others in the instant messenger environment, the only ID published to the public is the instant messenger ID. The advantage of this is that the mobile phone number is protected, which increase the privacy of the mobile client. Also, this arrangement increases the convenience of the communication, such that a "buddy" recognized or stored by a mobile client 410 does not need to remember or store the phone number. Members of an online community typically communicate with each other through either their nicknames or their instant messenger. A PC client 405 has no need to store the mobile phone number of the mobile client 410. In fact, in one embodiment, a PC client 405 does not need to know, as an option, whether the subscriber being communicated is a mobile client 410, based on the instant messenger ID. All the PC client knows is that it is communicate with someone in the instant messaging environment.

When a mobile client 410 sends a message to the PC client 405, the message typically includes the mobile phone number associated with the mobile client 410 and the instant messenger ID of the destination client (e.g., instant messenger ID of the PC client 405). The message is transmitted through a mobile network 409, such as a satellite network. The message is then processed by a mobile short message center 408. The mobile short message center 408 controls the management of short message system in mobile service. Optionally, a value added server (VAS) 407 may be involved to provide various value added functions of short message service. The message is then transferred through the mobile network interface gateway 406 to the Internet 404. Typically, the message is transferred through a TCP/IP protocol in the Internet. Other protocols may be utilized. Next, the mobile phone instant messenger inter-working server (MPIMIS) 402 receives the message via the Internet 404. The MPIMIS 402 processes the message including extracting the mobile phone number of the mobile client 410 from the message and binding it with a unique instant messenger ID. The MPIMIS 402 typically allocates an instant messenger ID from the instant messenger server 401 and queries the status of the destination PC client 405, based on the destination instant messenger ID.

The mobile network interface gateway 406 provides a connection between the mobile network and the Internet, such that the message can be transferred between two networks. The mobile network may comprise a global system for mobile (GSM) network. Other networks may be involved; such as code division multiple access (CDMA) and general packet radio service (GPRS) networks.

The present invention introduces a way to bind mobile phone number and Instant Messenger ID and to display mobile phone status, so as to implement real interconnection between two different networks. In the mobile network and Internet, a mobile phone number and an Instant Messenger ID can map to each other and have a one-to-one correspondence. Therefore, in mobile phone short message platform applications, users can use the unique ID in the Instant Messenger network to replace the mobile phone number in the mobile network, thus sharing the ID of the Instant Messenger network (the IM ID) in the two networks. Although the Instant Messenger ID and the mobile phone number are mapped one to one, it would be appreciated that a mobile phone number may be mapped to multiple Instant Messenger Ids. Thus a mobile phone user can use different Instant Messenger Ids to communicate with different "buddy". Similarly, an Instant Messenger ID map be mapped to multiple mobile phone numbers, such that an instant message can be sent to multiple mobile phones (e.g., a phone at home and another phone at the office).

In addition, online and offline presence indicators, which identify the user's status, have found wide application and appeal in Instant Messenger networks. As a mobile phone number corresponds to Instant Messenger ID, in the present invention, an Instant Messenger ID can be used to show the online or offline status of the mobile phone, so as to introduce the status concept into the field of mobile instant messaging. Binding a mobile phone number and an Instant Messenger ID, and displaying a mobile phone status are both aspects of the present invention, featuring information exchange without disclosing the mobile phone number.

Figure 5:
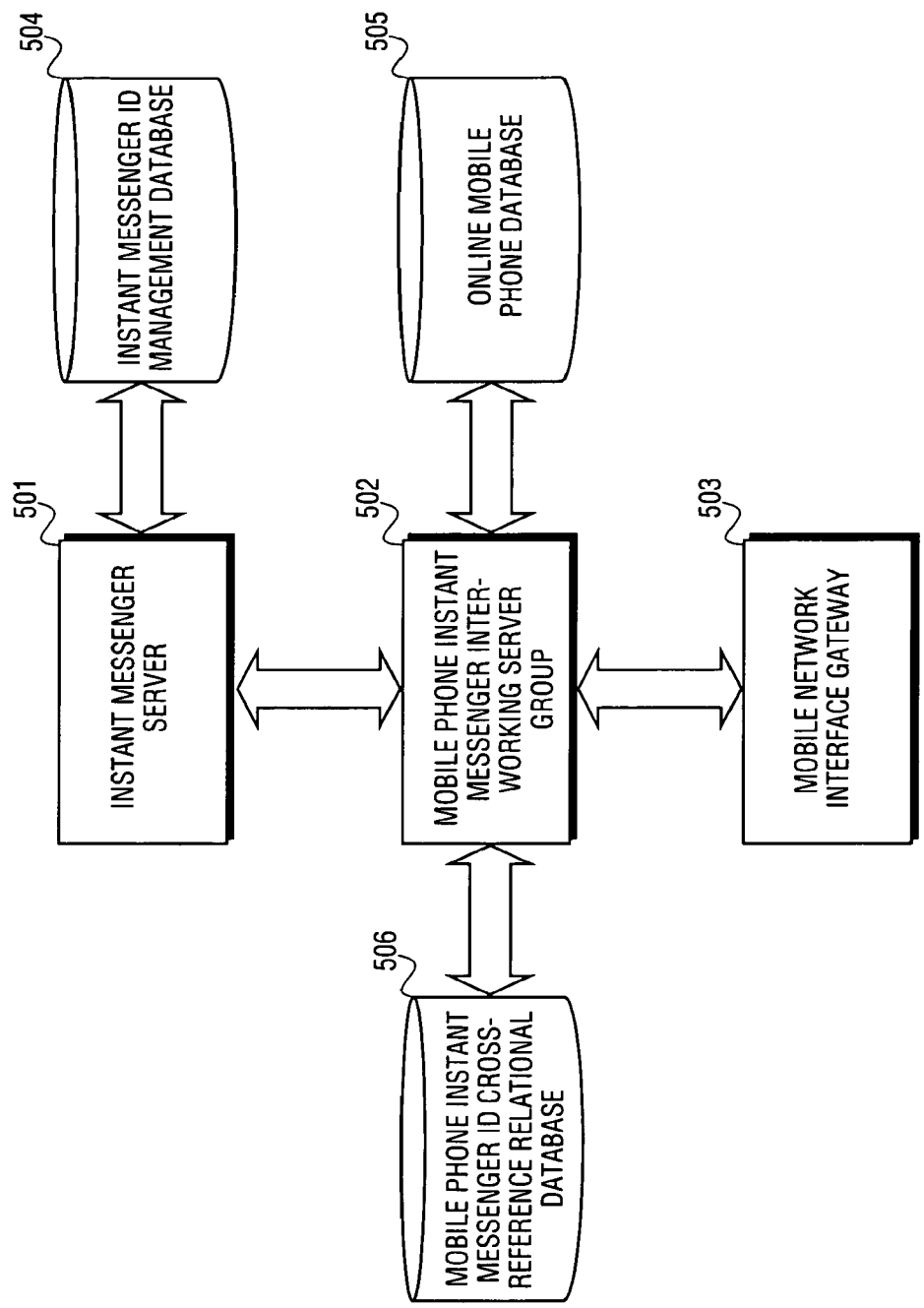
FIG. 5 shows storage components used by one embodiment of the present invention.

FIG. 5 shows a block diagram illustrating storage components that may be used by an exemplary embodiment of the present invention. The storage components shown in FIG. 5 include an instant messenger ID management database 504, mobile phone instant messenger ID cross-reference relational database 506, and an online mobile phone database 505. Before a mobile client 410 can send and receive an instant message, it must register to the system 400. The registration request is received by the mobile network interface 503 and is processed by the mobile phone instant messenger inter-working server (MPIMIS) 502. The MPIMIS 502 binds the mobile phone number to a unique instant messenger ID. Initially, the MPIMIS 502 allocates an instant messenger ID from the instant messenger (IM) server 501. The IM server 501 manages all instant messenger IDs and stores instant messenger IDs in the instant messenger ID management database 504. The IM server 501 is responsible for allocating a unique instant messenger ID and updates the instant messenger ID management database 504. The MPIMIS 502 receives the newly created instant messenger ID from the IM server 501 and stores both the instant messenger ID and the mobile phone number in a mobile phone instant messenger ID cross-reference relational database 506. The database 506 provides cross-reference on both the instant messenger ID and the mobile phone number. Thus the database is indexed by both instant messenger ID and the mobile phone number. Hence, the instant messenger ID can be searched and retrieved based on the mobile phone number, or vice versa.

The online mobile phone database 505 stores the information regarding whether the mobile client is online, and other related information. As described above, before a mobile client 410 can communicate with others through an instant messaging system (or network), the mobile client 410 must register and log on to the IM network. When the mobile client 410 logs on the IM network, the MPIMIS 502 stores the mobile phone number and other related information in the online mobile phone database 505 to indicate the mobile client 410 is online. Thus, when another client, such as another mobile client 410 or a PC client 405, tries to query the mobile client 410, the MPIMIS 502 can retrieve the information from the online mobile phone database 505 and return appropriate information to the requester. When the mobile client 410 logs off from the IM network, MPIMIS 502 will update the online mobile phone database 505 to indicate the corresponding mobile client if offline, such that the MPIMIS can return the correct information upon subsequent queries. Although, the database shown in FIG. 5 is described as a single database, it would be appreciated that the database may be implemented in multiple databases. Alternatively, the instant messenger ID management database 504, the mobile phone instant messenger ID cross-reference relational database 506, and the online mobile phone database 505 may be implemented in a single database with different partitions.

Figure 6:
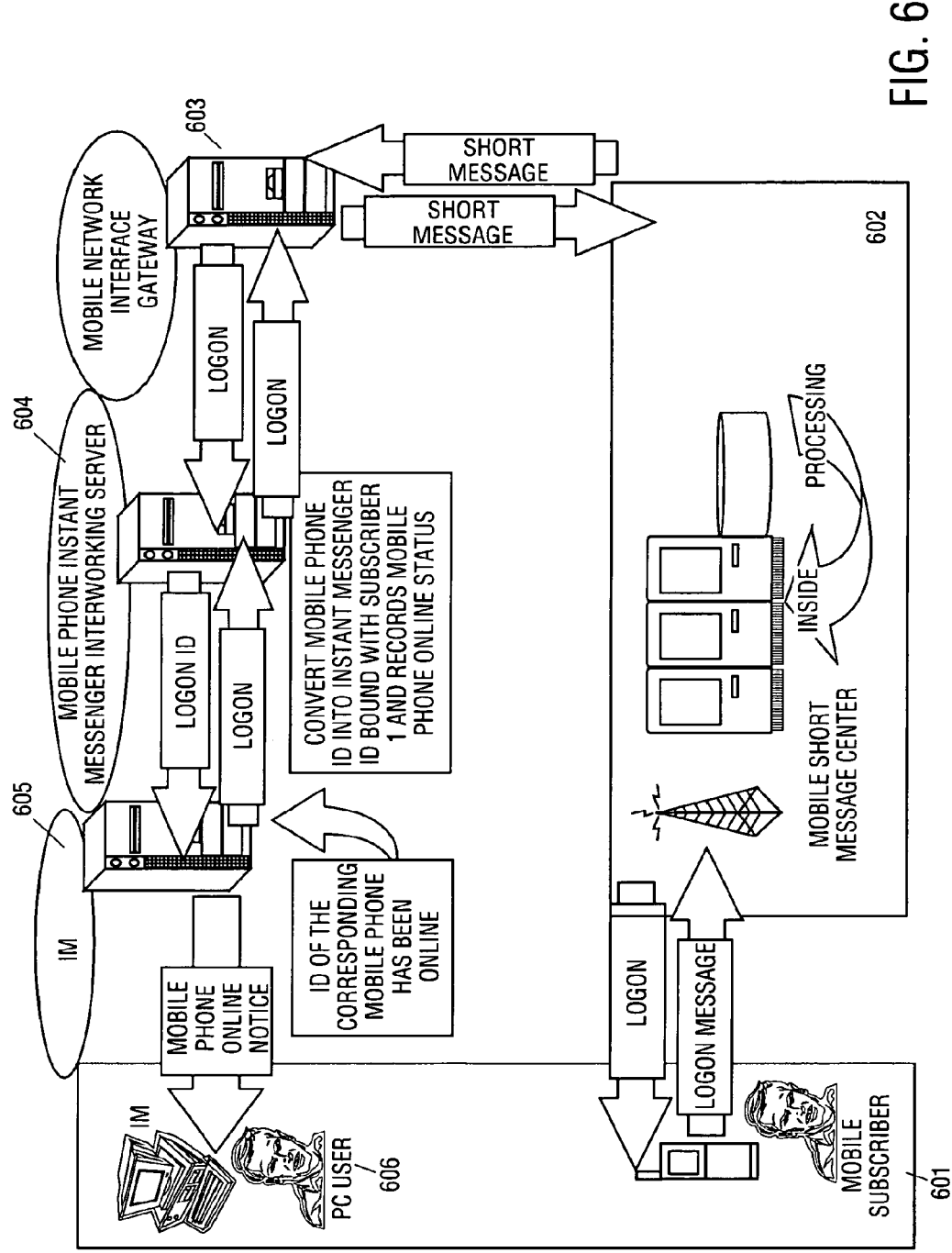
FIG. 6 shows a block diagram of login processes of an aspect of the invention.
Figure 7:
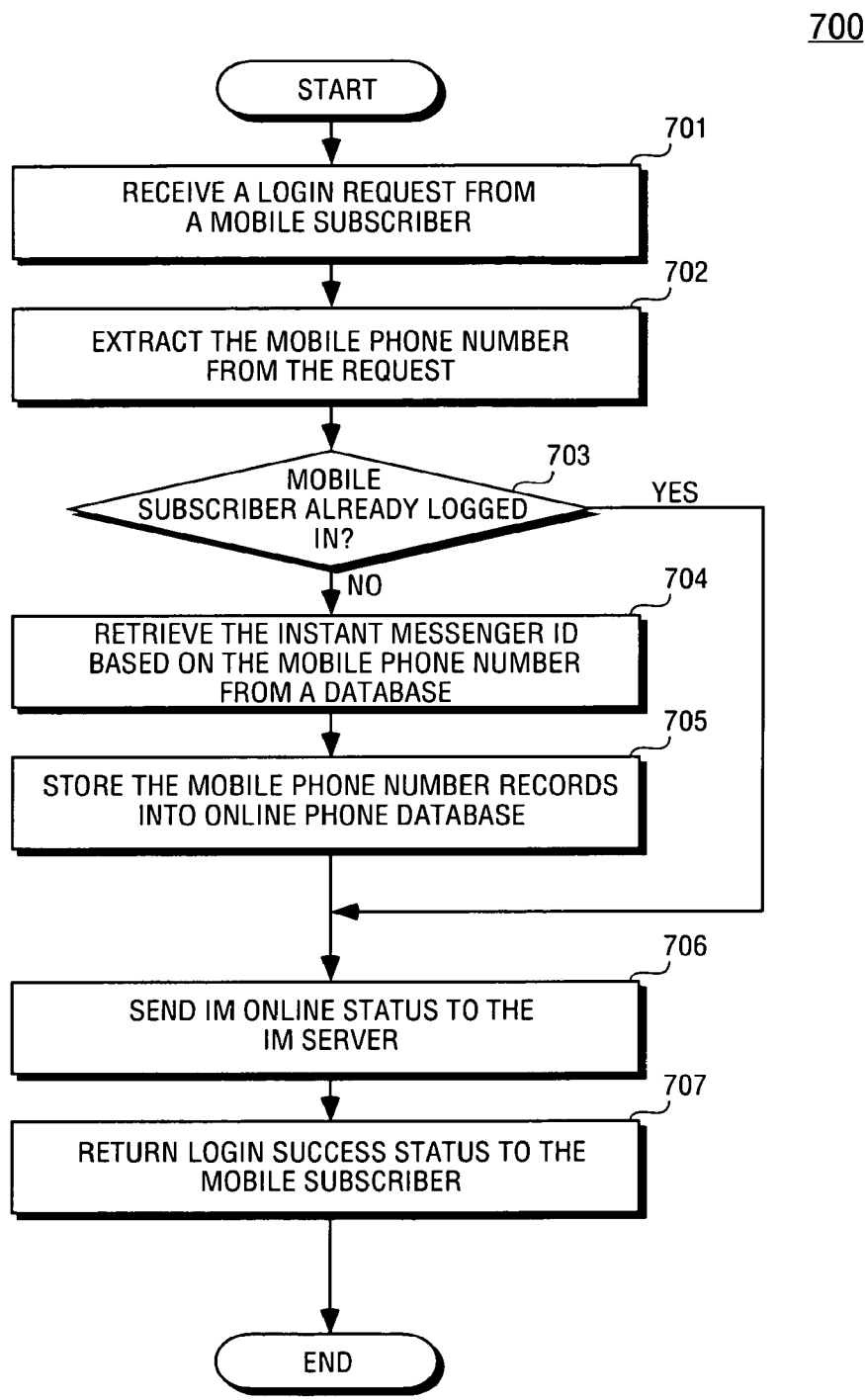
FIG. 7 is a flowchart illustrating a login process of an embodiment of the invention.

FIG. 6 shows a diagrammatic representation of an exemplary mobile client logon processes and FIG. 7 shows a flow chart of the exemplary logon processes 700, according to one embodiment of the present invention. Referring to FIG. 6 and FIG. 7, when a mobile client 601 tries to a log on a communications network, it sends a logon message to the mobile short message center 602 through a mobile network. The logon message is received (block 701) by the mobile network interface gateway 603 from the mobile short message center 602. The message is then transferred to the mobile phone instant messenger inter-working server (MPIMIS) 604. The MPIMIS 604 then extracts (block 702) the mobile phone number from the logon request. The MPIMIS 604 then examines the mobile phone number to determine whether the mobile client 601 corresponding to the mobile phone number has already logged on. A typical method to determine whether the mobile client has logged on to the network is to check whether the mobile phone number exists in the online mobile phone database, such as database 505 of FIG. 5. Other methods may exist. If the mobile client 601 has already logged on (e.g., the phone number exists in the online mobile phone database), the MPIMIS 604 then sends the online status of the mobile client 601 to the instant messenger (IM) server 605 to update the status of the mobile client 601. The IM server 605 then broadcasts the online status of the mobile client 601 to the PC client 606. As a result, the screen of the PC client will show an online status of the mobile client 601.

If the MPIMIS 604 determines that the mobile client 601 has not logged on to the network, the MPIMIS 604 will retrieve (block 704) the instant messenger ID from a database, such as mobile phone instant messenger ID cross-reference relational database 506 of FIG. 5, based on the mobile phone number of the mobile client 601. The MPIMIS 604 then stores (block 705) the phone number in the online phone database, such as database 505, to indicate that the corresponding mobile client 601 has logged on. Thereafter, the MPIMIS 604 sends (block 706) an online status indicating the mobile client 601 is online, to the IM server 605 and returns (block 707) the logon success status back to the mobile client 601, through the mobile network interface 603 and the mobile short message center 602.

Figure 8:
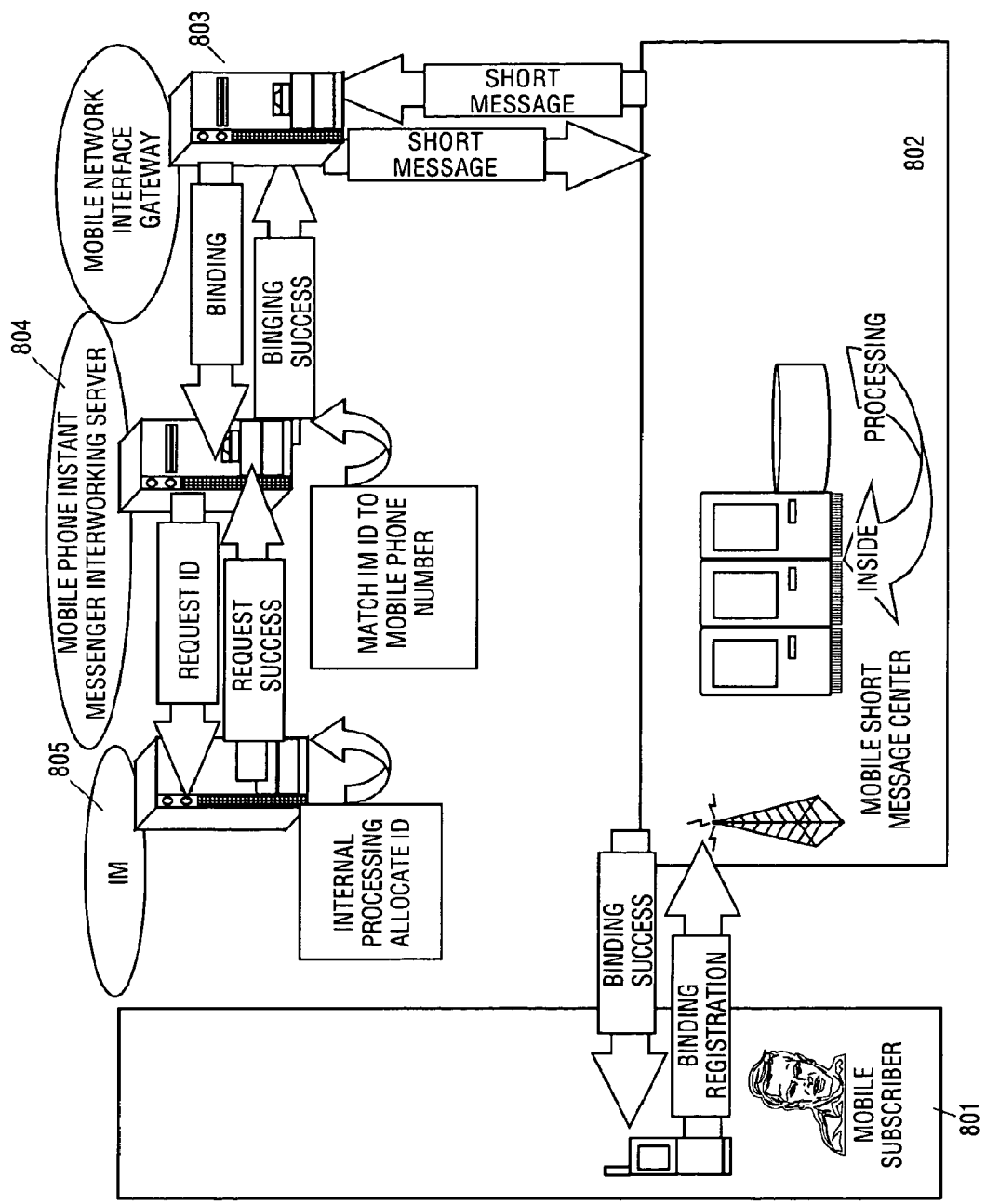
FIG. 8 shows a block diagram of binding a mobile ID with an instant messenger ID according to one embodiment of the invention.
Figure 9:
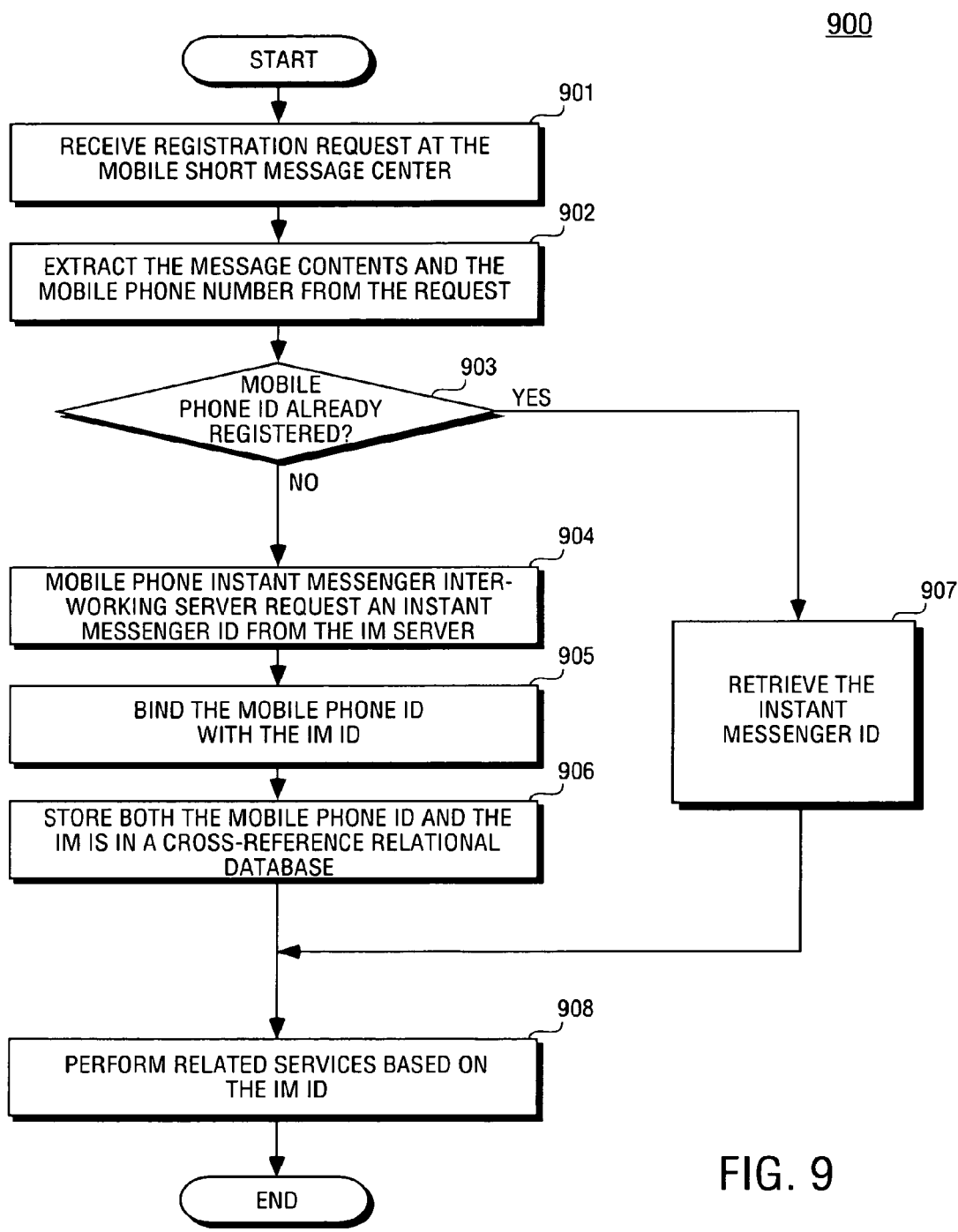
FIG. 9 is a flowchart illustrating a method binding a mobile ID with an instant messenger ID, in one embodiment of the invention.

One of the advantages of the present invention is that the mobile phone number and the instant messenger ID are bound. As a result, the instant messenger ID is shared between two networks, the mobile network and the instant messenger network. In addition, with the instant messenger ID bound with the mobile phone number, the mobile phone number can be hidden without jeopardizing the privacy of the mobile client 601. FIG. 8 shows a diagrammatic representation of binding an instant messenger ID with a mobile phone number, according to an exemplary embodiment of the present invention. FIG. 9 shows a corresponding flow chart of a method 900 of binding, according to one embodiment of the invention. The method 900 involves receiving a binding request from a mobile phone, the binding request comprising the mobile phone number, generating an instant messenger ID corresponding to the mobile phone number, storing the instant messenger ID and the mobile phone number in a database, wherein the instant messenger ID is associated with the mobile phone number, and performing related services of the binding request based on the instant messenger ID.

Referring to FIG. 8 and FIG. 9, the mobile client 801 sends a registration request through the mobile short message center 802. The mobile phone instant messenger inter-working server (MPIMIS) 804 receives (block 901) the request from the mobile short message center 802 through the mobile network interface gateway 803. The MPIMIS 804 then extracts (block 902) the message contents and the mobile phone number from the request. Next, the MPIMIS 804 determines (block 903) whether the mobile phone has already registered with the system. If the mobile client 801 has already registered to the system, the system then retrieves the corresponding instant messenger ID from a database, such as mobile phone instant messenger ID cross-reference relational database 506 of FIG. 5, and performs (block 908) other related services based on the instant messenger ID.

If the mobile client 801 has not registered in the system, the MPIMIS 804 requests (block 904) an instant messenger ID from the instant messenger (IM) server 805. The IM server 805 generates a unique instant messenger ID and updates it in the instant messenger ID management database, such as database 504 of FIG. 5. The MPIMIS 804 then binds (block 905) and stores (block 906) both the instant messenger ID and the mobile phone number in the mobile phone instant messenger ID cross-reference relational database 506.

Figure 10:
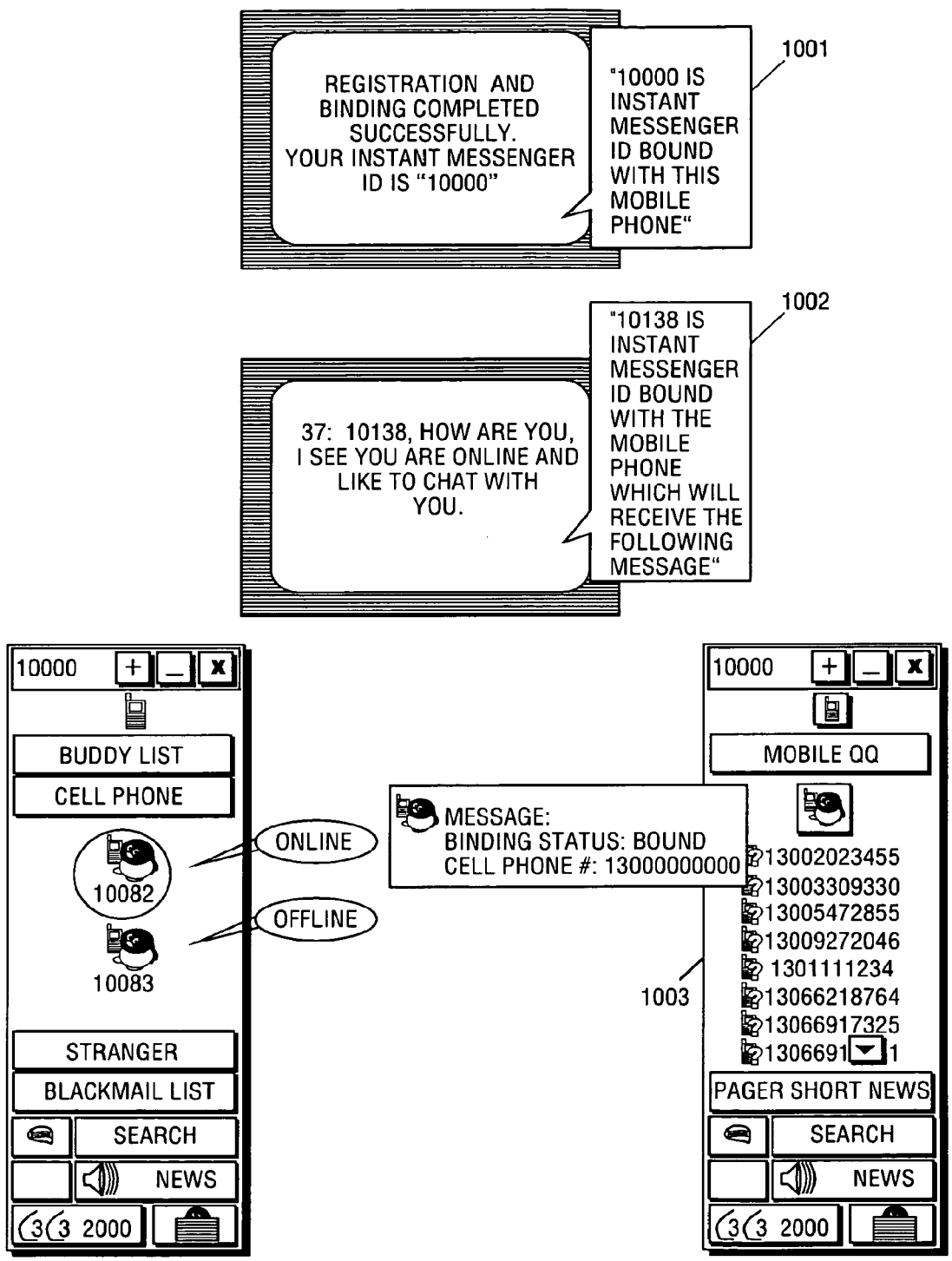
FIG. 10 shows a user interface of binding a mobile ID with an instant messenger ID, in one embodiment of the invention.

FIG. 10 shows exemplary screen shots, according to one embodiment of the present invention. Screen shot 1001 shows, on a mobile phone screen, that the mobile phone has successfully registered and bound its phone number to an instant messenger ID of "10000". The screen shot 1002 shows that a mobile client sends (e.g., command of "37") a short message to a destination with a corresponding instant messenger ID of "10138". The message will be sent, through the mobile phone/instant messenger inter-working system, to the mobile phone already bound with the instant messenger ID of "10138". The screen shot 1003 shows an instant messenger tools executed in the instant messenger system server showing that which mobile phone is bound with what instant messenger ID. Here referring to screen shot 1003, the instant messenger ID of "10000" is bound with the mobile phone number of "13000000000".

Figure 11:
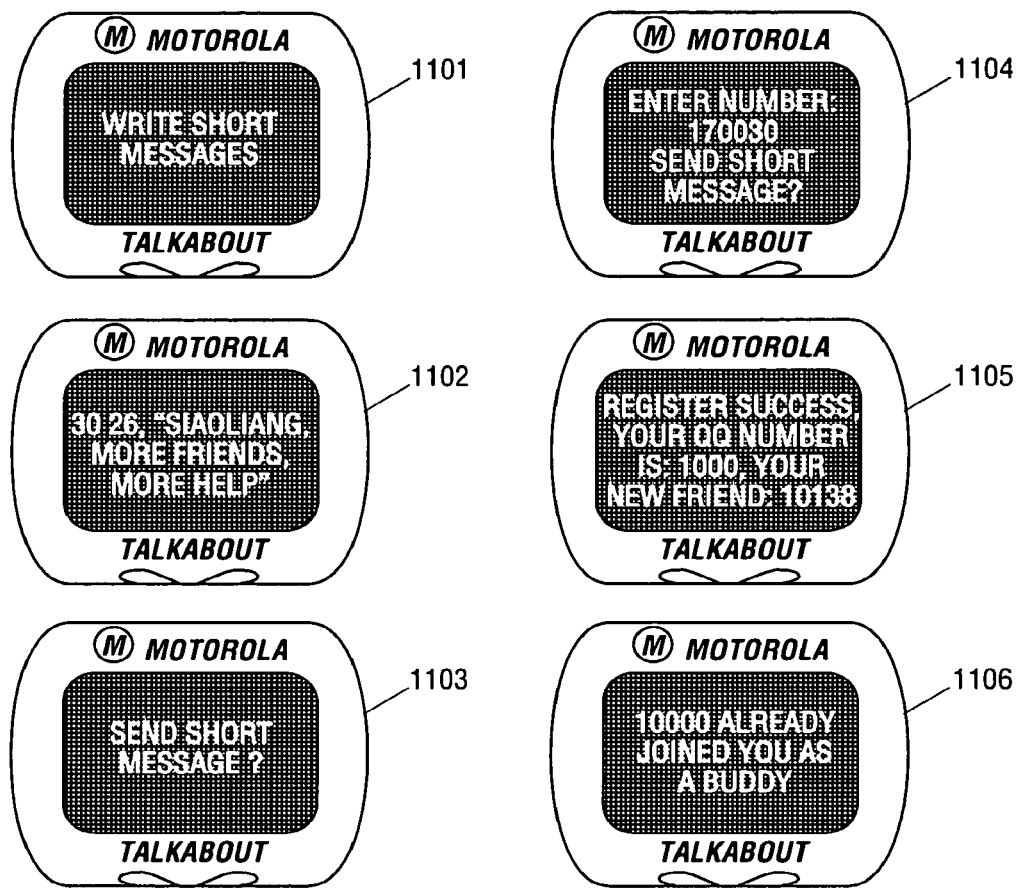
FIG. 11 shows yet another user interface of binding a mobile ID with an instant messenger ID, in one embodiment of the invention.

FIG. 11 shows a sequence of exemplary screen shots that illustrates a registration process of a mobile client. A mobile client enters the short message section 1101 and writes a short message 1102. After the sending confirmation 1103, the MPIM system prompts the user for its mobile phone number 1104 and the user enters the phone number of "170030". The MPIM system then verifies and binds the mobile phone with an instant messenger ID. As shown in 1105, the mobile phone number of "170030" is successfully bound with an instant messenger ID of "10000". At the same time, the screen of the mobile client shows a friend or a buddy with instant messenger ID of "10138" has joined the buddy list. On the other hand, the screen of the other mobile client which corresponds to the instant messenger ID of "10138" shows its buddy 10000 has joined the room. Similarly, a PC client also shows similar result indicating a buddy or friend has joined the discussion section.

Another feature of the invention is that the system can provide and display a status of a client on a screen of either mobile client or PC client. A typical element of this feature is a presence indicator, indicating whether such client is online. In one embodiment, a special character such as "*" shown on a mobile phone screen, next to an instant messenger ID, indicates the client corresponding to the instant messenger ID is online. Similarly, on a PC client screen the color or brightness (or any other visual differentiation) of the corresponding instant messenger ID indicates that corresponding client is online.

Figure 12:
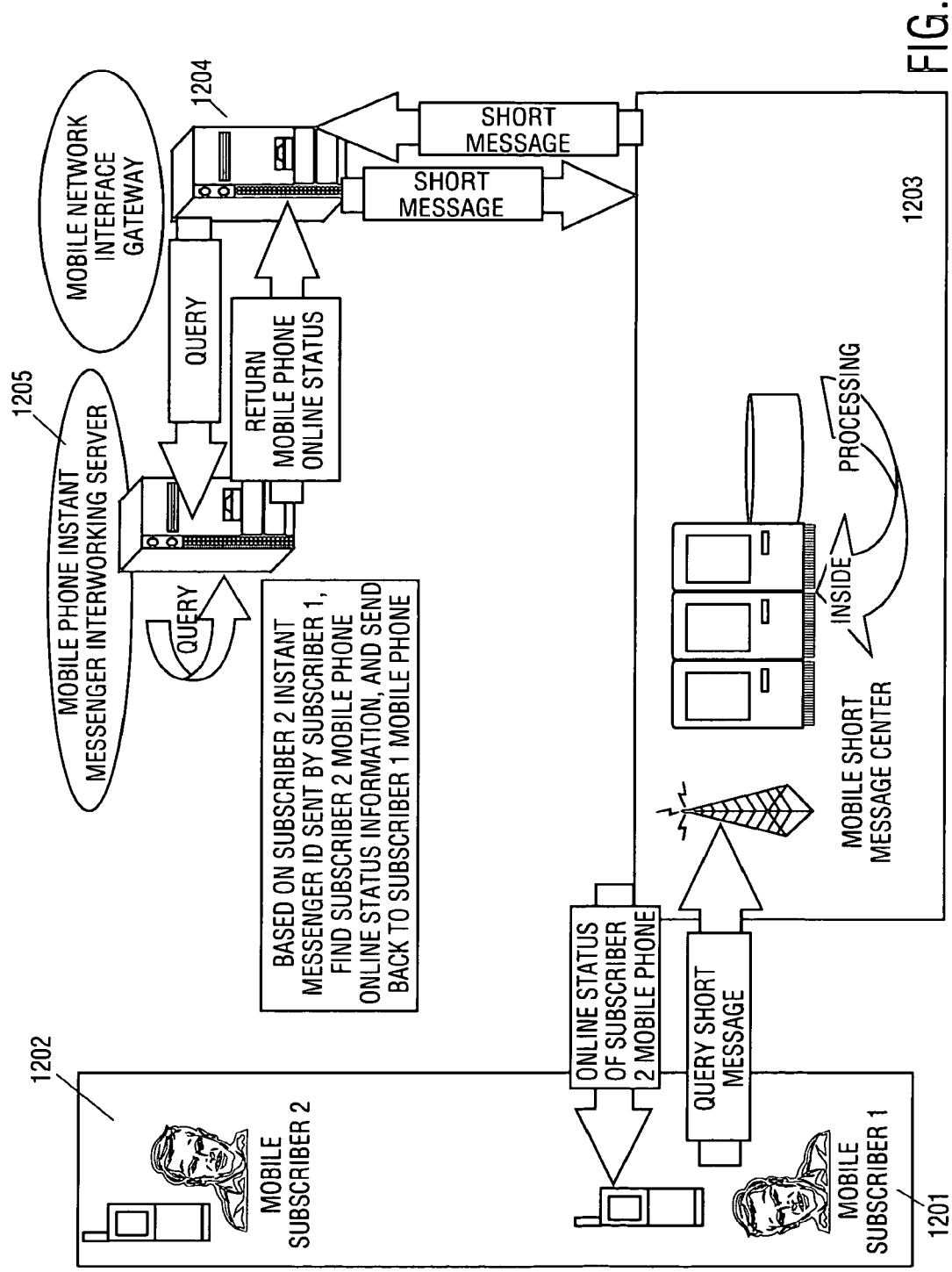
FIG. 12 shows a block diagram of querying status of another instant messenger subscriber, according to one embodiment of the invention.
Figure 13:
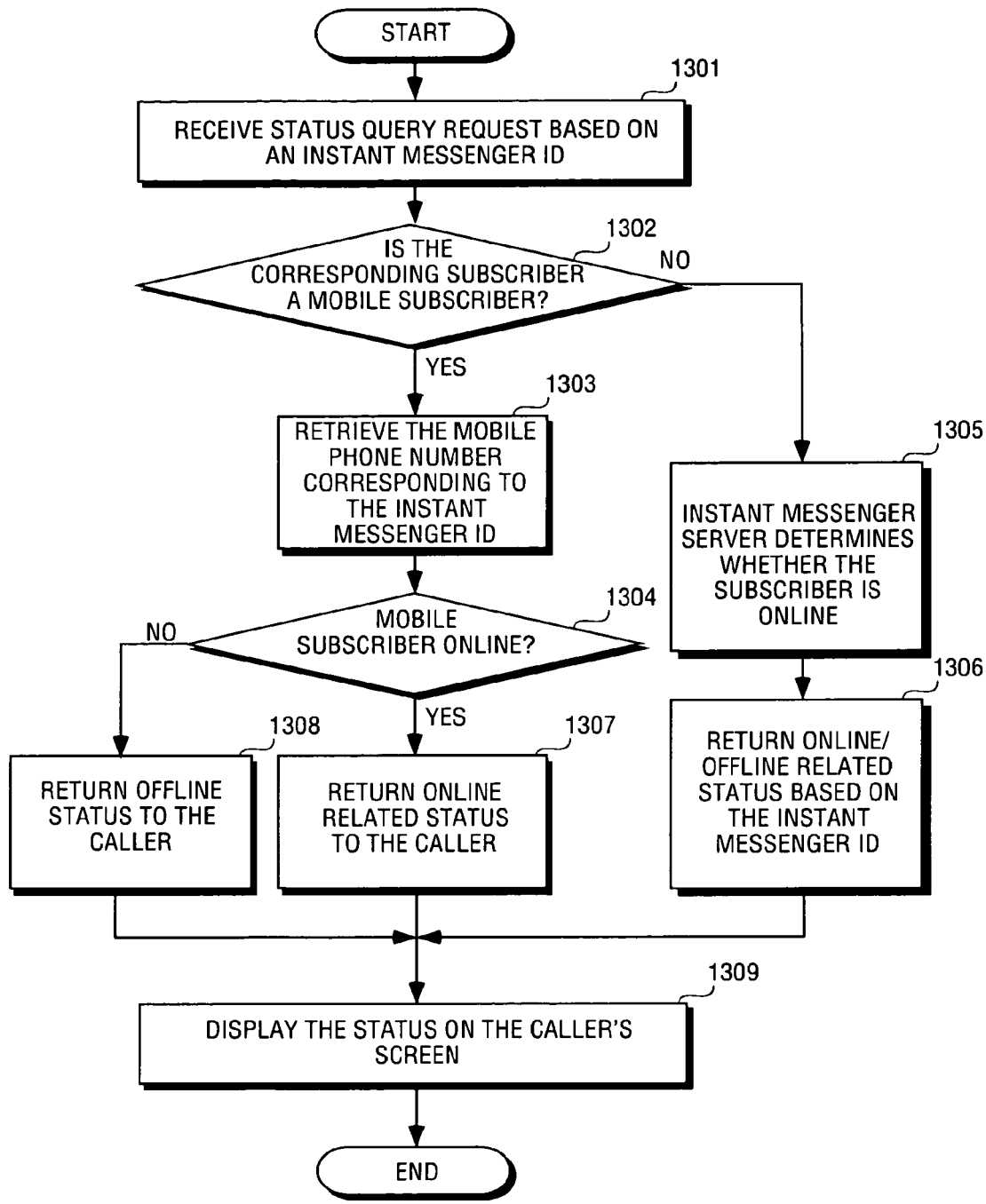
FIG. 13 is a flowchart illustrating a status query of an instant messenger client in one embodiment of the invention.

FIG. 12 shows a diagrammatic representation of querying and displaying a status of one mobile client to another mobile client, according to one exemplary embodiment of the present invention. FIG. 13 shows a corresponding method 1300 of processing a status query processes, according to one embodiment of the invention. When a mobile client 1201 desires to query the status of mobile client 1202, the mobile client 1201 sends a status query request to the mobile phone instant messenger inter-working server (MPIMIS) 1205, through the mobile short message center 1203 of the mobile network and the mobile network interface 1204. The request received 1301 at the MPIMIS 1205 includes an instant messenger ID whose status is being queried. The MPIMIS 1205 examines the query request to determine whether the client corresponding to the instant messenger ID is a mobile client. In one embodiment, the MPIMIS 1205 checks whether a mobile communication ID, corresponding to the instant messenger ID, exists. In case of a mobile (e.g., cellular) phone, the mobile communication ID is its cellular phone number.

If the client whose status is being queried is a mobile client, the MPIMIS 1205 retrieves 1303 the corresponding mobile phone number from a database, such as mobile phone instant messenger ID cross-reference relational database 506 of FIG. 5, based on the instant messenger ID. Based on the mobile phone number, the MPIMIS 1205 then checks whether the mobile client is online. In one embodiment, the MPIMIS 1205 checks in the online mobile phone database, such as database 505, whether the mobile phone number exists in the database. Since all mobile clients have to logon before they can use instant messenger, the MPIMIS 1205 would have stored their mobile phone numbers or mark them as online, in the online mobile phone database when they logged on. Similarly, the MPIMIS 1205 may erase or mark the corresponding mobile phone numbers as off line, when they log off. If the targeted mobile client 1202 is online (e.g., its mobile phone number exists), the MPIMIS 1205 returns the online status message to the originating mobile client 1201. Otherwise, the MPIMIS 1205 returns offline status message to the mobile client 1201.

If the client whose status is being queried is not a mobile client (e.g., PC client), the MPIMIS 1205 invokes the instant messenger server to determine whether the targeted client is online. The IM server is responsible to manage all non-mobile clients. In one embodiment, the IM server checks whether the targeted client is online through a database, such as the instant messenger ID management database 504 of FIG. 5. The IM server then returns the status message back to MPIMIS 1205, which in turn returns the status back to the originated mobile client 1201 and the mobile client 1201 displays the status of the targeted client on its screen.

Figure 14:
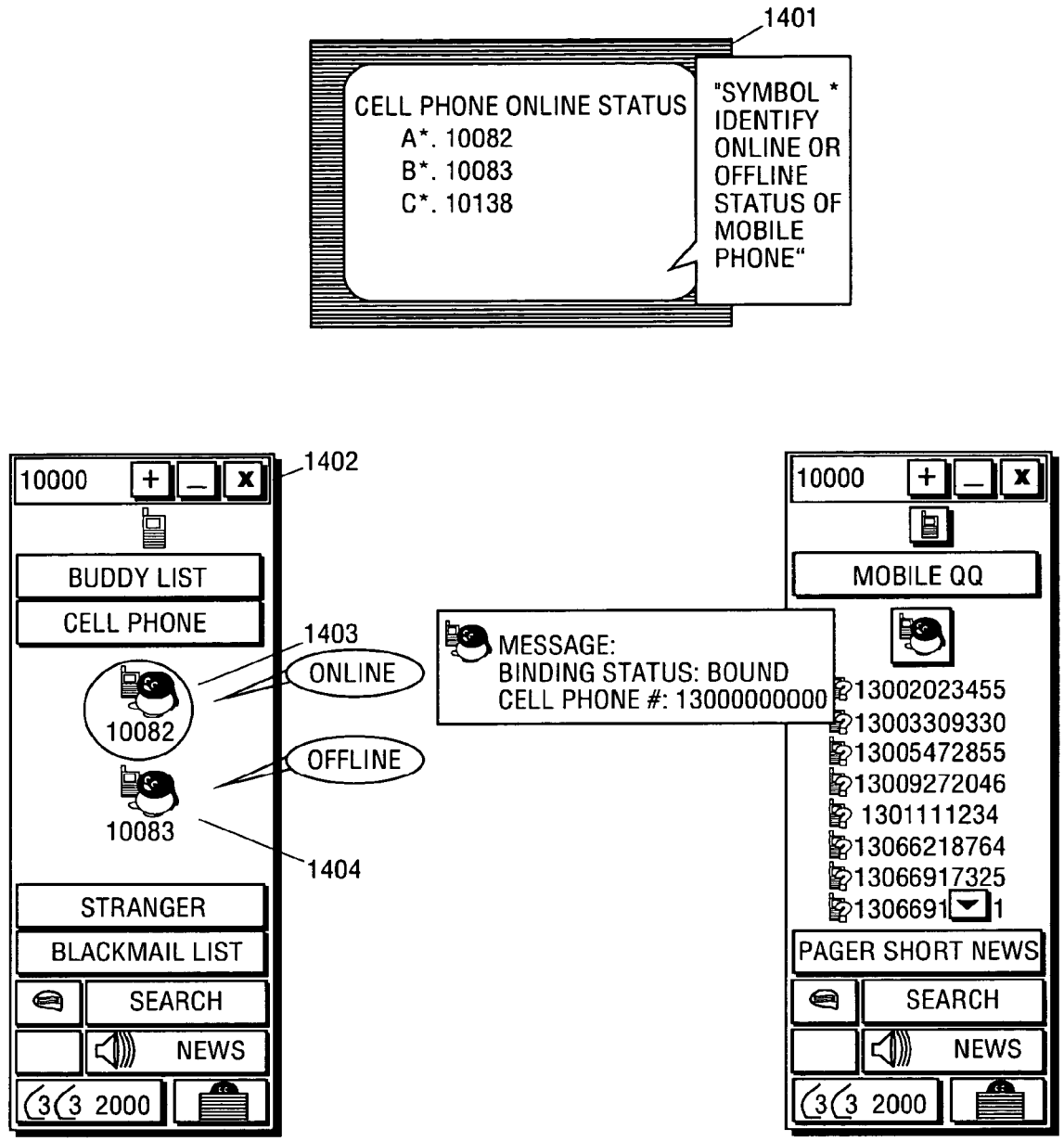
FIG. 14 shows an exemplary user interface of status query in one embodiment of the invention.

FIG. 14 shows exemplary screen shots pertaining to the status query and status display using one of the methods discussed above. Screen shot 1401 is a status display on a mobile client's screen. After the status query using the above method, the screen indicates of whether the targeted clients are online. In one embodiment, the online status may be represented by a special character. As shown in screen shot 1401, clients 10082 and 10138 are online, indicated by a special character, such as "*" here, while the client 10083 is offline. Other indicators or indicating methods may be employed. Screen shot 1402 is a corresponding status display on a PC client. The online status of a mobile client may be indicated, for example, by either the color, brightness or some other visual differentiation of the icon, such as icon 1403, which indicate the mobile client 10082 is online. On the other hand, the offline client 1404 is dim, which indicates the mobile client 10083 is offline. It is useful to note that a user of the PC client knows whether the clients 10082 and 10083 are mobile clients, based on the icons representing them (e.g., the icon comprises an image of a mobile phone). In another embodiment, the icon may be customized to include other icons that sufficiently represent their characteristics of the corresponding clients. For example, the icon representing a wireless personal digital assistant (PDA) may comprise a symbol of a Palm device. The instant messenger users may not care whether the other "buddies" are utilizing mobile clients or PC clients, and may only want to be able to communicate with them through instant messenger network. In a further embodiment, the status display may not show whether the clients are mobile or PC clients, such as screen shot 1401.

Instant messenger technology may be deployed in an enterprise environment. In the enterprise environment, a corporation customer representative can instantly communicate with its customers. The icons representing the instant messenger client may be customized to include the corporation's logo, which may increase the market awareness of the corporation. Moreover, it is possible, in the enterprise environment to allocate one corporate logo icon to numerous individual user in the corporation. Thus, someone communicating with the corporation using the corporate logo may, in fact, be communicating with multiple users inside the corporation maybe without being aware of this fact. This could, for example, be very useful in the "help line" or similar consumer assistance service-environments provided by corporations.

Figure 15:
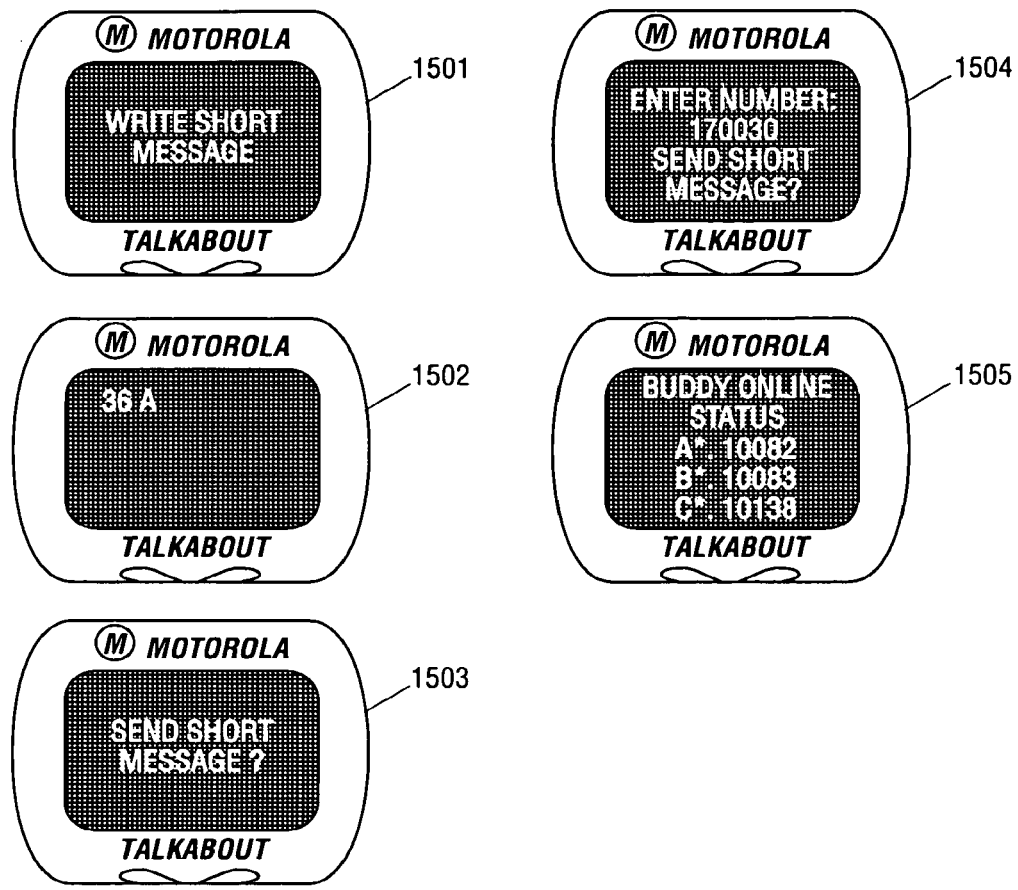
FIG. 15 shows yet another exemplary user interface of status query in one embodiment of the invention.

FIG. 15 is a sequence of exemplary screen shots representing the status query from a mobile client. A mobile client user who desires to query another client's status enters 1501 in the short message section of the instant messenger. Then the mobile client user enters 1502 a status query command, such as command of "36". After the confirmation 1503, the instant messenger system prompts 1504 the user for a mobile phone number and sends out the status query. The status returned from the network is shown on the screen 1505, wherein the clients 10082 and 10138 are online, indicated by a special character "*", and client 10083 is offline. Other characters may be used to indicate the online status.

Figure 16:
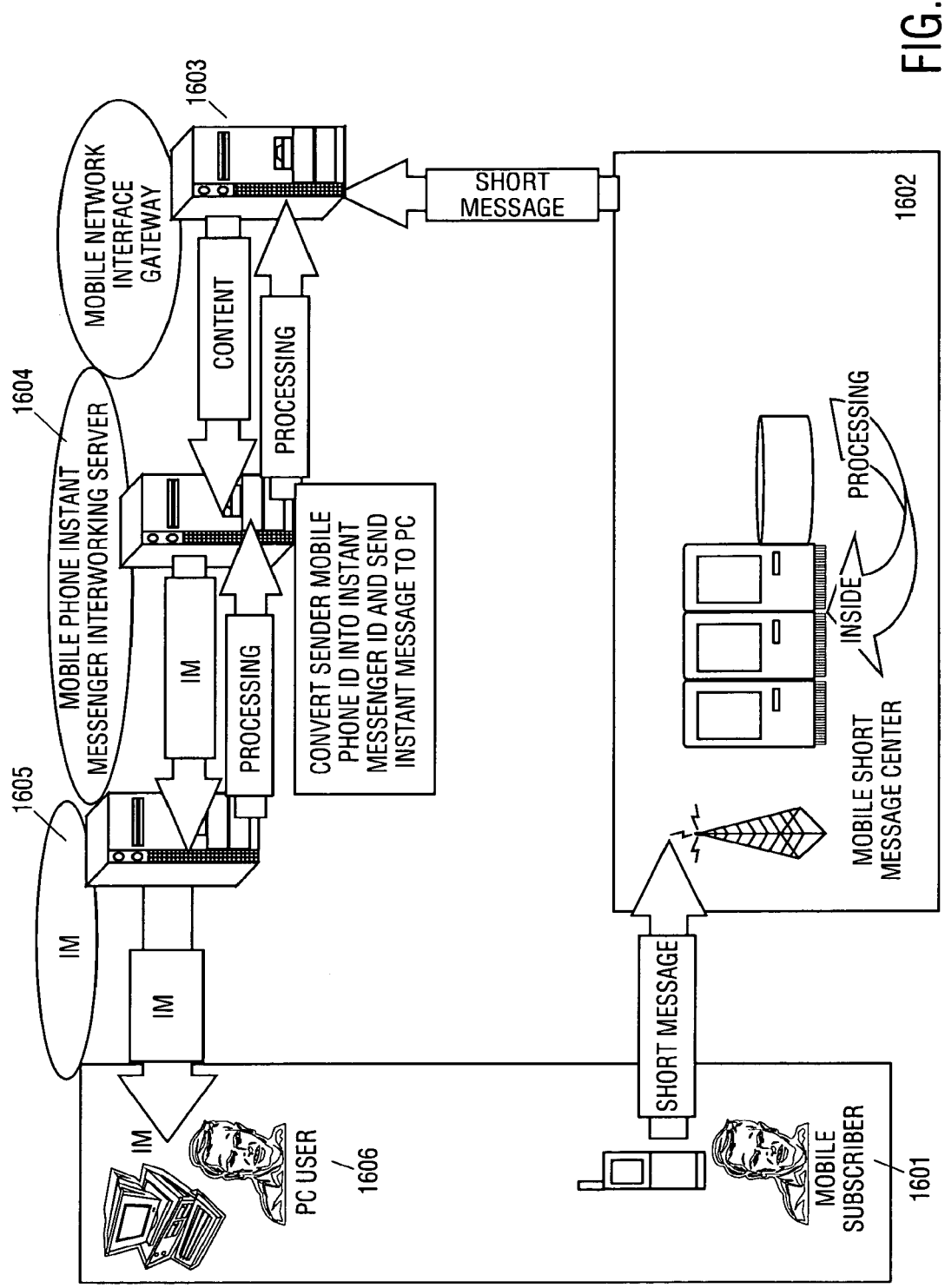
FIG. 16 shows a block diagram of an instant communication between a mobile client and a PC client in one embodiment of the invention.

FIG. 16 illustrates an exemplary instant messenger communication between a mobile client 1601 and a PC client 1606. When a mobile client 1601 desires to send an instant message to a PC client 1606, it sends a short message through a mobile network to the mobile short message center 1602. The short message center 1602 processes the message and sends the message to the mobile phone instant messenger inter-working server (MPIMIS) 1604, through the mobile network interface gateway 1603. The MPIMIS 1604 extracts the mobile phone number of the mobile client 1601 and the instant messenger ID of the PC client 1606, from the message. The MPIMIS 1604 then retrieves the instant messenger ID bound with the mobile phone number of the mobile client 1601. As discussed above, before a mobile client 1601 can communicate with others through the instant messenger network, the mobile client 1601 has to register and bind its mobile phone number with its instant messenger ID. If the MPIMIS 1604 determines that the mobile phone number is not bound with the instant messenger ID, the MPIMIS 1604 will return error message and terminates the processes.

If the mobile phone number has been registered and bound with the corresponding instant messenger ID, the MPIMIS 1604 then sends the message, along with the instant messenger ID of the originated mobile client 1601 to the instant messenger server 1605. Based on the instant messenger ID of the PC client 1606, the instant messenger server 1605 sends the message to the PC client 1606, as well as the instant messenger ID of the mobile client 1601. As a result, the message and the instant message ID of the mobile client 1601 may be displayed in the screen of the PC client 1606. In one embodiment, an icon representing the mobile client may be displayed, wherein the icon may sufficiently represent the characteristic of the mobile phone (e.g., an image of a mobile phone). In a further embodiment, the message and the icon may be displayed in a browser that is able to display multiple pages including the instant messenger page in a single instance (e.g., window) of the browser.

Figure 17:
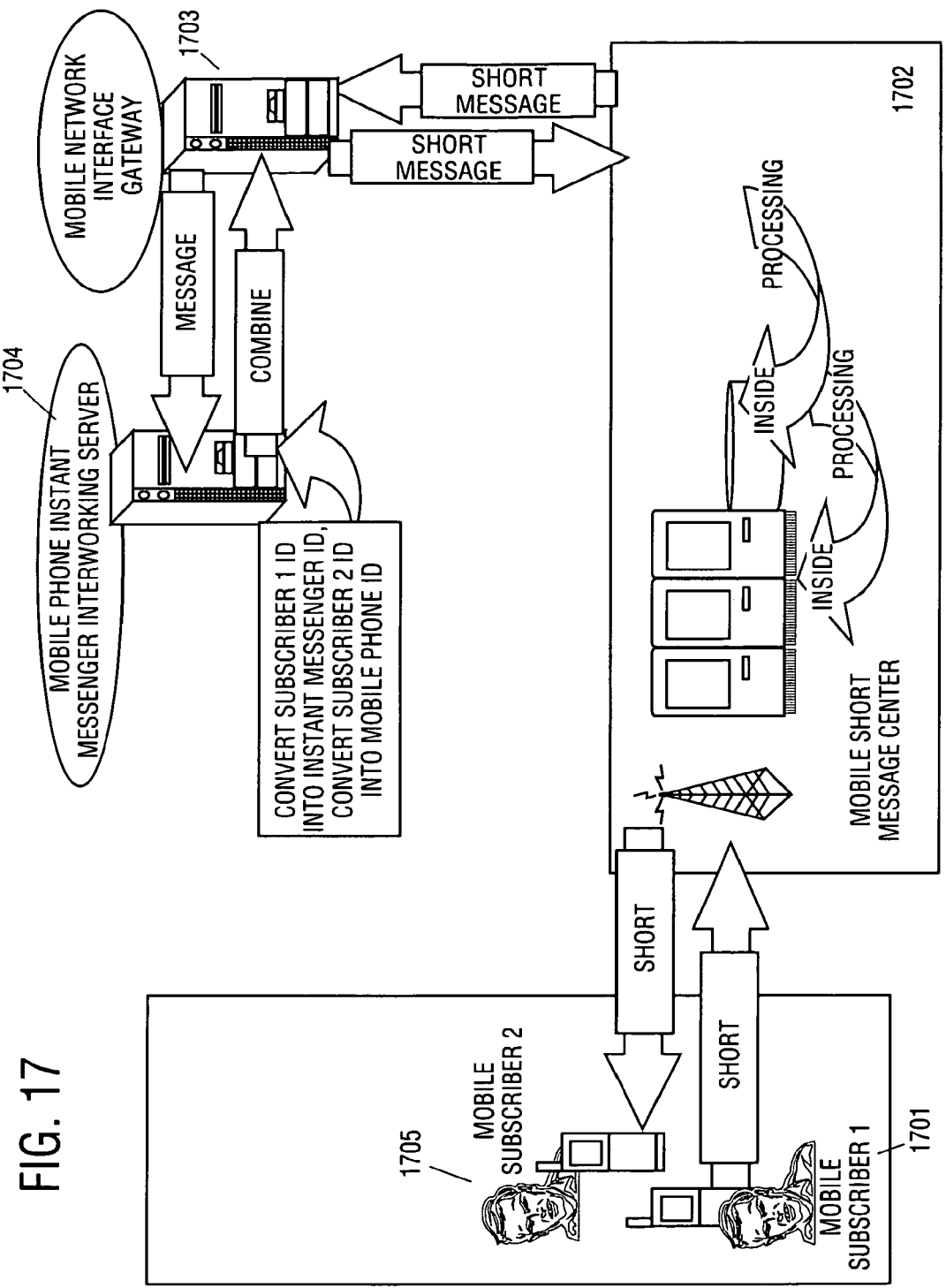
FIG. 17 shows a block diagram of an instant communication between two PC clients in one embodiment of the invention.

FIG. 17 shows an exemplary instant messenger communication between two mobile clients 1701 and 1705. Similarly, before two mobile clients can communicate with each other through the instant messenger network, both clients need to register and bind their respective mobile phone numbers with their instant messenger Ids. When the mobile client 1701 desires to send an instant message to the mobile client 1705, it sends a short message including the mobile phone number of client 1701 and the instant messenger ID of client 1705, to the mobile short message center 1702 through a mobile network. The mobile short message center 1702 processes the message and sends it to the mobile phone instant messenger inter-working server (MPIMIS) 1704, through the mobile network interface gateway 1703. The MPIMIS 1704 extracts the mobile phone number of client 1701 and the instant messenger ID of client 1705, from the message. The MPIMIS 1704 then retrieves the mobile phone number corresponding to the instant messenger ID of the client 1705 and the instant messenger ID corresponding to the mobile phone number of the client 1705, from a database, such as mobile phone instant messenger ID cross-reference relational database 506 of FIG. 5. The MPIMIS 1704 next packages another outgoing message including the mobile phone number of client 1705 and the instant messenger ID of client 1701. The MPIMIS 1704 then sends the outgoing message back to the mobile short message center 1702 through the mobile network interface gateway 1703. The mobile short message center processes the outgoing message and sends the message to the mobile client 1705 through the appropriate mobile network, based on the mobile phone number of the mobile client 1705. As a result, the message and the instant messenger ID of client 1701 are displayed on the screen of the mobile client 1705. It is useful to note that the instant messenger communication is based on the instant messenger ID of both mobile clients. Only the instant messenger ID will be shown on the screen, instead of mobile phone number. As a result, the privacy of the mobile phone number has been protected.

Figure 18:
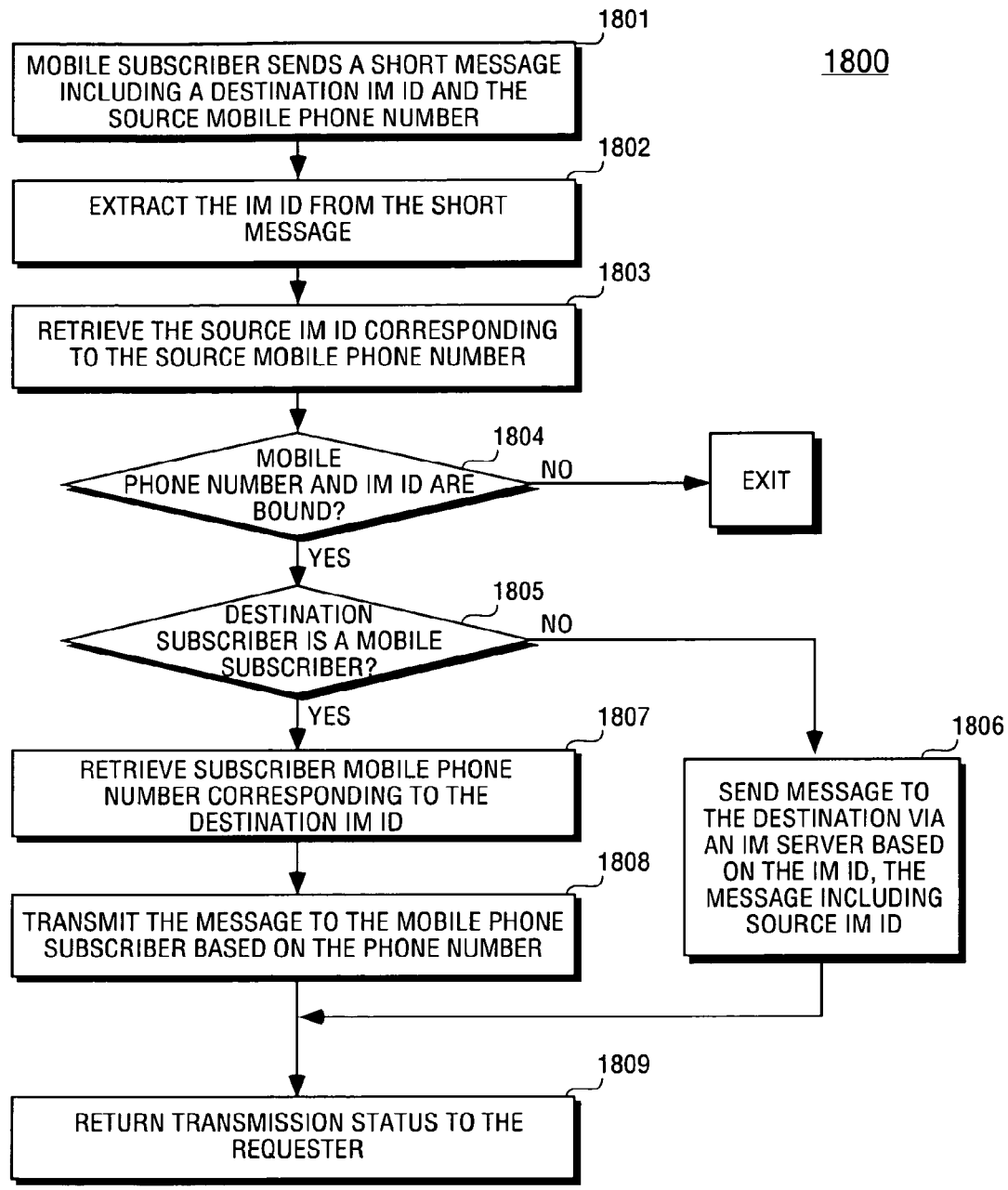
FIG. 18 shows a flowchart illustrating instant communication between a mobile client and a PC client, and between a mobile client and another mobile client.

FIG. 18 shows a method 1800 of sending an instant message to a mobile client or a PC client, according to one exemplary embodiment of the present invention. The method 1800 starts with a mobile subscriber sending (block 1801) a short message to the mobile phone instant messenger inter-working server (MPIMIS). The message includes the mobile phone number of the source mobile client and the instant messenger ID of the targeted client. The MPIMIS extracts (block 1802) the mobile phone number of the source client and the instant messenger ID of the targeted client from the message. The MPIMIS then retrieves (block 1803) the instant messenger ID of the source client, based on its mobile phone number. The MPIMIS checks (block 1804) whether the instant messenger ID and the mobile phone number of the source client are bound beforehand. If the mobile phone number and the instant messenger ID of the source client are bound, the MPIMIS examine the instant messenger ID of the targeted client to determine (block 1805) whether the targeted client is a mobile client. In one embodiment, the MPIMIS checks in a database, such as database mobile phone instant messenger ID cross-reference relational database 506 of FIG. 5, whether the corresponding mobile phone exists. The existence of the corresponding mobile phone number indicates that the targeted client is a mobile client. If the targeted client is not a mobile client, the MPIMIS transmits (block 1806) the message to the instant messenger server. The IM server then transmits the message to the targeted client (e.g., PC client) based on the instant messenger ID of the targeted client.

If the targeted client is a mobile client (e.g., the mobile phone number corresponding to the instant messenger ID exists), the MPIMIS retrieves (block 1807) the mobile phone number corresponding to the instant messenger ID of the targeted client from the database. The MPIMIS then transmits (block 1808) the message and the mobile phone number of the targeted client to the mobile short message center through the mobile network interface gateway. The mobile short message center than transmits the message through the mobile network to the targeted mobile client, based on the mobile phone number of the targeted client.

Figure 19:
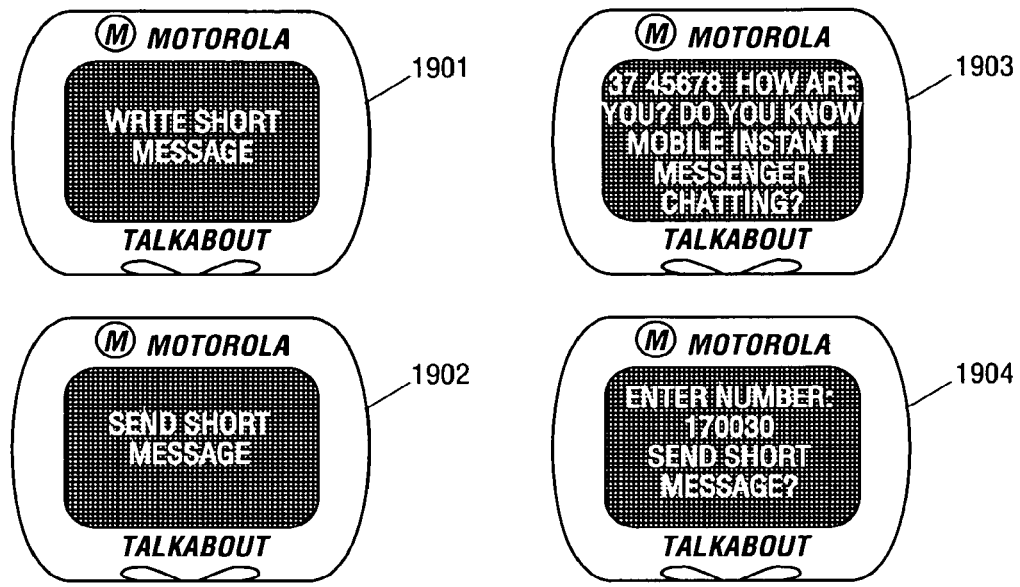
FIG. 19 shows a mobile-to-mobile instant messenger communication in one embodiment of the present invention.

FIG. 19 shows an exemplary sequence of sending an instant message from a mobile client. The user first enters 1901 the short message section 1902. The user then writes 1903 a short message to another client 45678. Next the user enters its own mobile phone number of 170030 and sends out the message. The message may be targeted to another mobile client or the message may be targeted to a PC client.

Figure 20A:
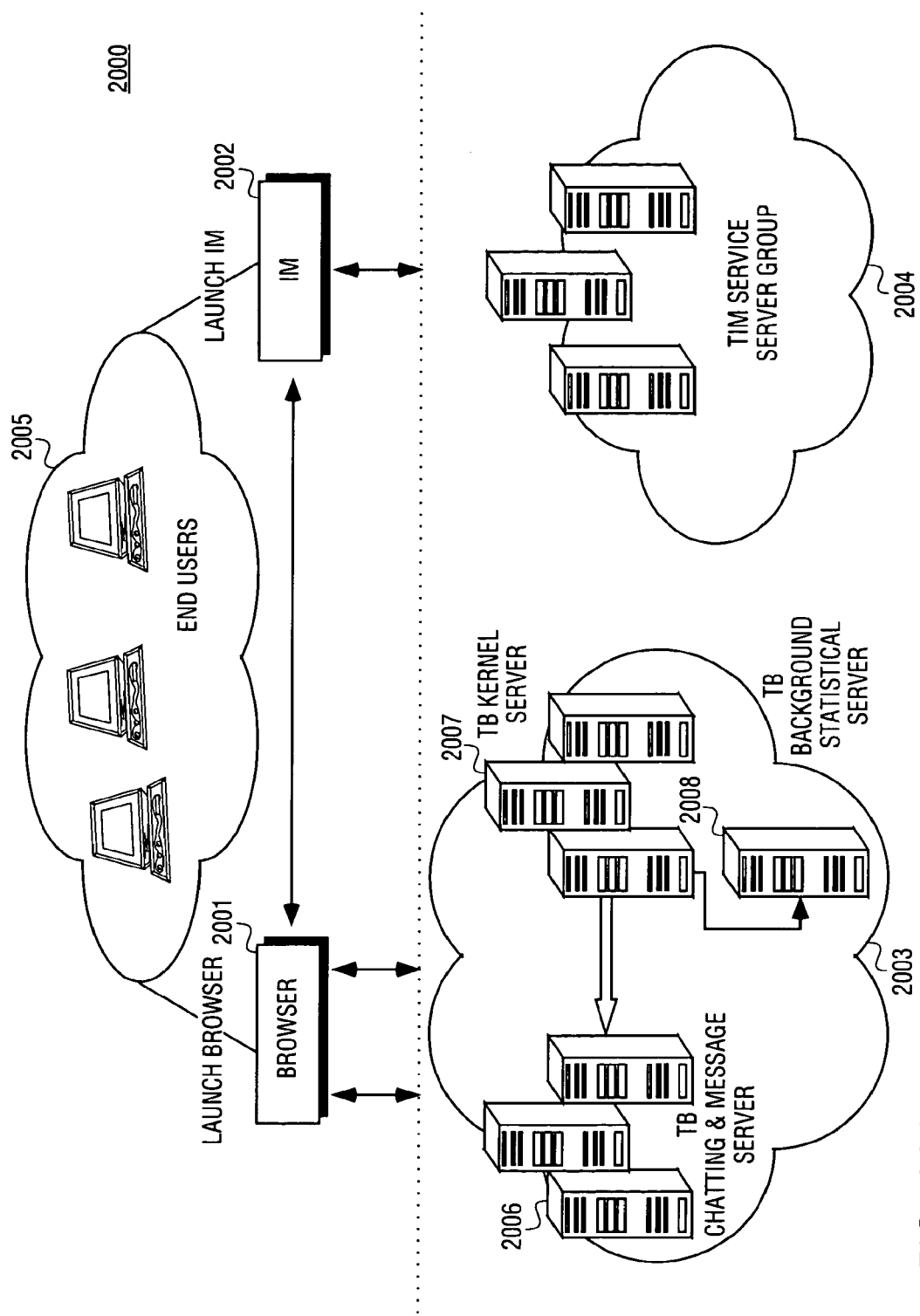
FIG. 20A shows an exemplary Internet browsing system with instant communication capability, according to one embodiment of the invention.

When a PC receives the message, the message may be displayed through an instant messenger pop-up window. The window may be launched from a hidden application, such as a tray icon. Typically an instant messenger client is launched during the initialization of the operating system (e.g., when the user logs in to the network). In addition, the status of the buddy list may be displayed through another pop-up window such as window 1402 of FIG. 14. The Internet browser is also an important component of Internet technology in the current market. As a result, the present invention introduces a unique browser that embeds (or integrates) the instant messenger service, as well as other related services, such as chatting and message board services. With the browser of the present invention, a user can response to an instant message while the user is browsing a Web page within the same (or common) instance of the browser. A conventional browser is typically separate from an instant messenger (IM) application, executing on the same machine as a result, a user has to switch between the browser and the IM application to response to either action. Unlike a conventional browser, the present invention allow a user to browse a web and conduct IM service with others in the same browser. In addition, the browser of the invention allows multiple users visiting the same (or a common) Web page to communicate with each other through the instant messenger infrastructure. Furthermore, the browser of the invention is able to display multiple web pages in the same (or common) instance of the browser, without launch another instance of the browser, thus less memory resources and faster speed are employed. A conventional browser (e.g., Internet Explorer from Microsoft), has to launch multiple instances of the browser, in order to view the multiple pages. FIG. 20A is a block diagram of an Internet browsing system with instant messenger (IM) system built-in, according to one exemplary embodiment of the present invention. The system 2000 includes a browser 2001 which is able to communicate with a IM application (e.g., an IM client 2002), a IM server group for supporting any IM related services to the IM client 2002. The system 2000 also includes a browser server group 2003 supporting the browser 2001. The browser server group 2003 includes a chatting and message server 2006, browser kernel server 2007 and an analysis/statistical management server 2008. The system 2000 is able to support multiple users 2005 accessing the Internet.

Referring to FIG. 20A, the browser kernel server 2007 receives and responds to the registration of a user 2005 and returns the user online information to the browser 2001. The browser kernel server 2007 also keeps track the page browsing activities on the browser and to allow a user to check on the "who's with me" function, (e.g., providing information of other users who are visiting the same website or page simultaneously), to provide two-way instant network communications between friends via instant communications software. The browser kernel server also synchronously sends user online information to the chatting/voice mail server 2006 and gathers user online information before sending it to the statistical management server 2008.

The chatting and messaging server 2006 is responsible to manage real time chatting of users and to respond to users' requests to send out or read recorded messages. Statistics management server 2008 is responsible for the background management. Browser kernel server transmits the records of all access users to the statistics management server that will perform analysis on the records. IM server 2004 is responsible for providing instant messenger service to the user 2005.

In addition, the system may comprise software which includes the browser 2001, which is responsible for sending the identity requests to the IM server, transmitting the results of such requests to the browser kernel server 2007, keeping track with the access to pages in the user browser and transmitting the information to the browser server promptly. Another software component is the IM client 2002. The IM client 2002 is responsible for responding to the requests for user identity at user interface and transmitting to the IM server. Results of the inquiry may be sent to the browser 2001.

As described above, users have to log in to the instant messenger network before they can communicate with each other through the browser. A typical user will login to the IM server during the initialization of the PC (e.g., booting and login processes). When the user log in from the desktop, the corresponding instant messenger client 2002 is launched. The IM client 2002 transmits all necessary user information including instant messenger ID and the associated password to the IM server 2004. The IM server 2004 authenticates the login message and return verification to the IM client 2002. In another embodiment, the IM login processes may be launched manually by the user after the initialization phase of the PC. The IM client may be minimized as a tray icon on the desktop of an operating system. In another embodiment, the IM client may not contain user interface. The IM client may be accessed from the browser through a well-known inter-application communication mechanism. Other configuration may exist.

When the browser 2001 is launched, the browser communicates with the IM client 2002 to receive any user specific information regarding to the IM services. The browser then logs in to the browser kernel server 2007, using the user information passed along from the IM client 2002. In another embodiment, the browser kernel server 2007 may directly communicate with the IM server 2004 to collect all user related information. The browser kernel server 2007 then starts to keep track with the activities of the user, as well as other users who have logged in to the system. At the mean while, the browser kernel server 2007 provides all detailed information on the activities of the users to the analysis server (e.g., statistical server) to conduct statistics analysis on the activities of the users. The browser kernel server 2007 also collects the identities of all users logged in to the system, as well as their Web browsing activities, and transmits this information to the browser 2001 such that the browser 2001 can display identifiers for all the users who are visiting the same Web page for the purpose of "who's with me" capability. The user can select one of the users who are on the list (e.g., who is visiting the same Web page), to conduct further instant communication. The user can select a user to conduct instant chatting through the chatting and message server 2006. The chatting can be performed within the same instance of the browser. Similarly, the user can choose to leave or read a message to or from another user who has visited the same page.

This feature has increased the convenience to the Internet user. For example, multiple users can visit the same page at the same time to conduct a shopping online. They can communicate with each other to discuss the quality of the item being shopped instantly. They can also read or leave a message regarding to that Web page, even though they are not visiting the Web page at the same time. For an enterprise, this feature also facilitates near instant communication of customers' feedback comments to a corporation (or enterprise) on their products. In a further embodiment, the enterprise can respond nearly instantly to the customers if the customers have some questions on a specific sale item on the Web page before submitting the purpose order. As a result, the enterprise would not loose a sale transaction or a customer. It would be apparent to one skilled in the art that these features would be applied to other applications.

Figure 20B:
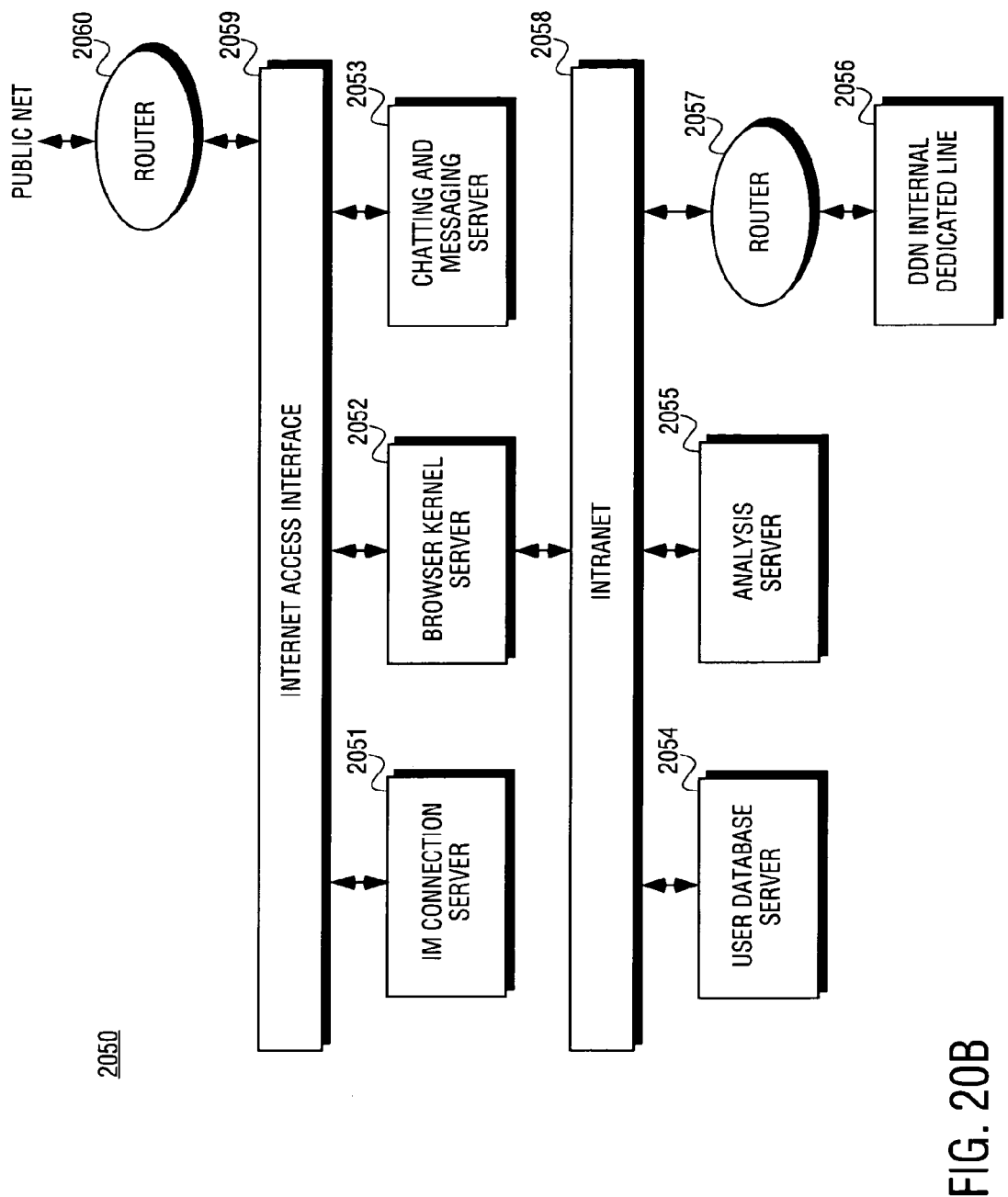
FIG. 20B shows another embodiment of the Internet browsing system of the invention.

FIG. 20B shows another embodiment of the invention. In addition to those server described in FIG. 20A, the system 2050 includes an IM user database server 2054, which may include an instant messenger mobile phone cross-reference relational database 506 of FIG. 5. The user database server 2054 and the analysis server 2055 are coupled to the browser kernel server 2052 through an intranet. Further administrative components of the system may be coupled through an internal digital data network (DDN) 2056, a telecom service of data communication. DDN is a dedicated digital private line service that allows subscribers to transmit and receive data, image, and voice between subscriber locations over a fiber optic digital network.

Figure 21:
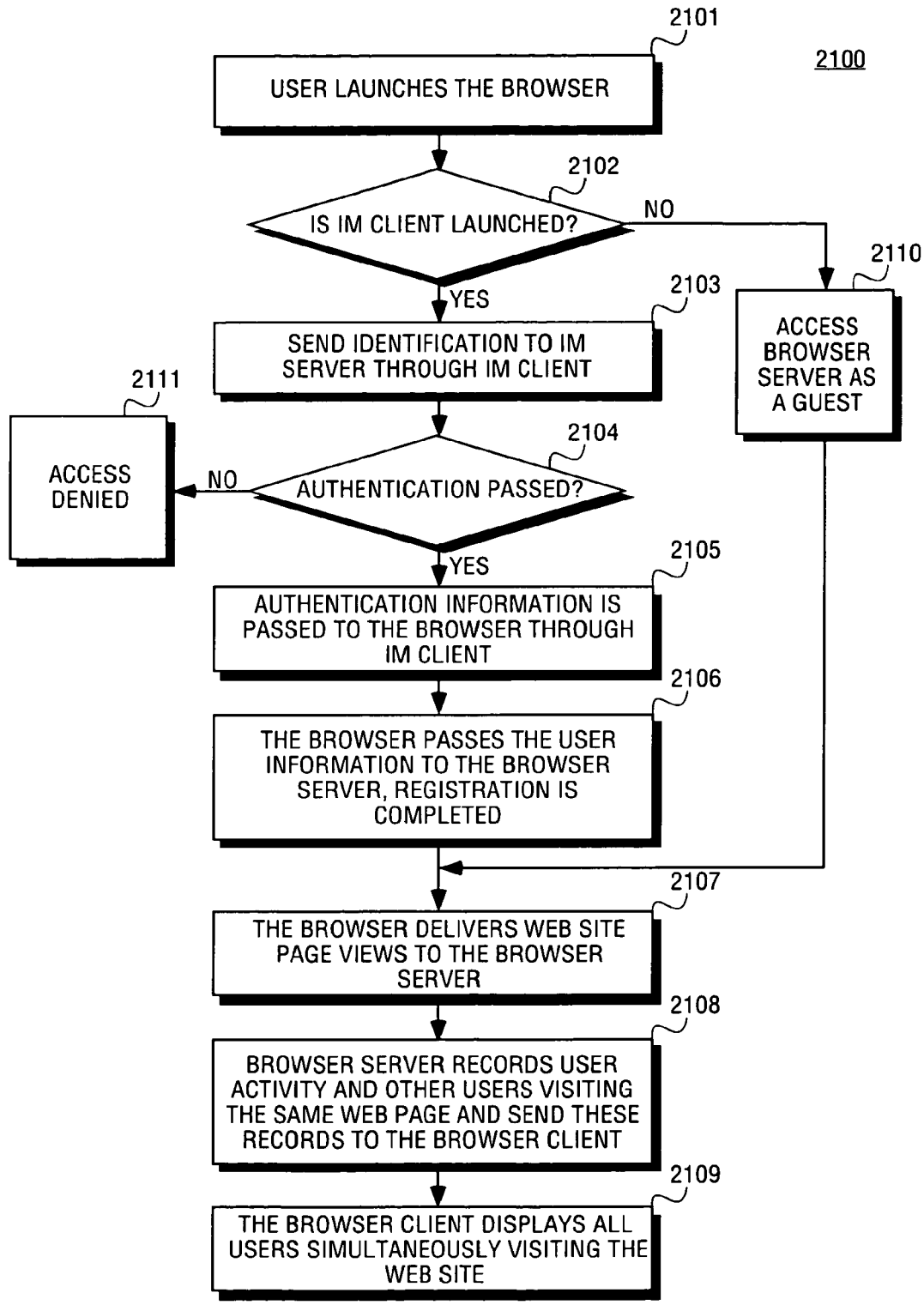
FIG. 21 shows a flowchart illustrating operation of an Internet browsing system with instant messenger capability of the invention.

FIG. 21 is a flowchart of data processing according to one embodiment of the present invention. When a user launches (block 2101) the browser, the browser checks 2102 whether the instant messenger (IM) client has already launched, if the IM client is already launched, the browser sends (block 2103) an authentication request to the IM server for authenticating the user, through IM client. The IM server performs the user authentication processes and checks (block 2104) whether the user is valid. If the user is not a valid user, the processing is rejected and the browser would not log in to the browser server. If the user is determined as a valid user, the IM server validates the user and sends (block 2105) the validation back to the browser through the IM client. The browser then uses such information to log in (block 2106) to the browser server and the browser server processing the login message. From then on, the browser delivers (block 2107) the Web site page view information the user currently browses, to the browser server. The browser may record (block 2108) all the related activities of the user and the information of the users who are visiting the same Web page simultaneously to the browser server. The browser server transmits all users' information collected through other browser clients logged in to the system, back to each browser client. The browser client then displays those users within the same instance of the browser.

Figure 22A:
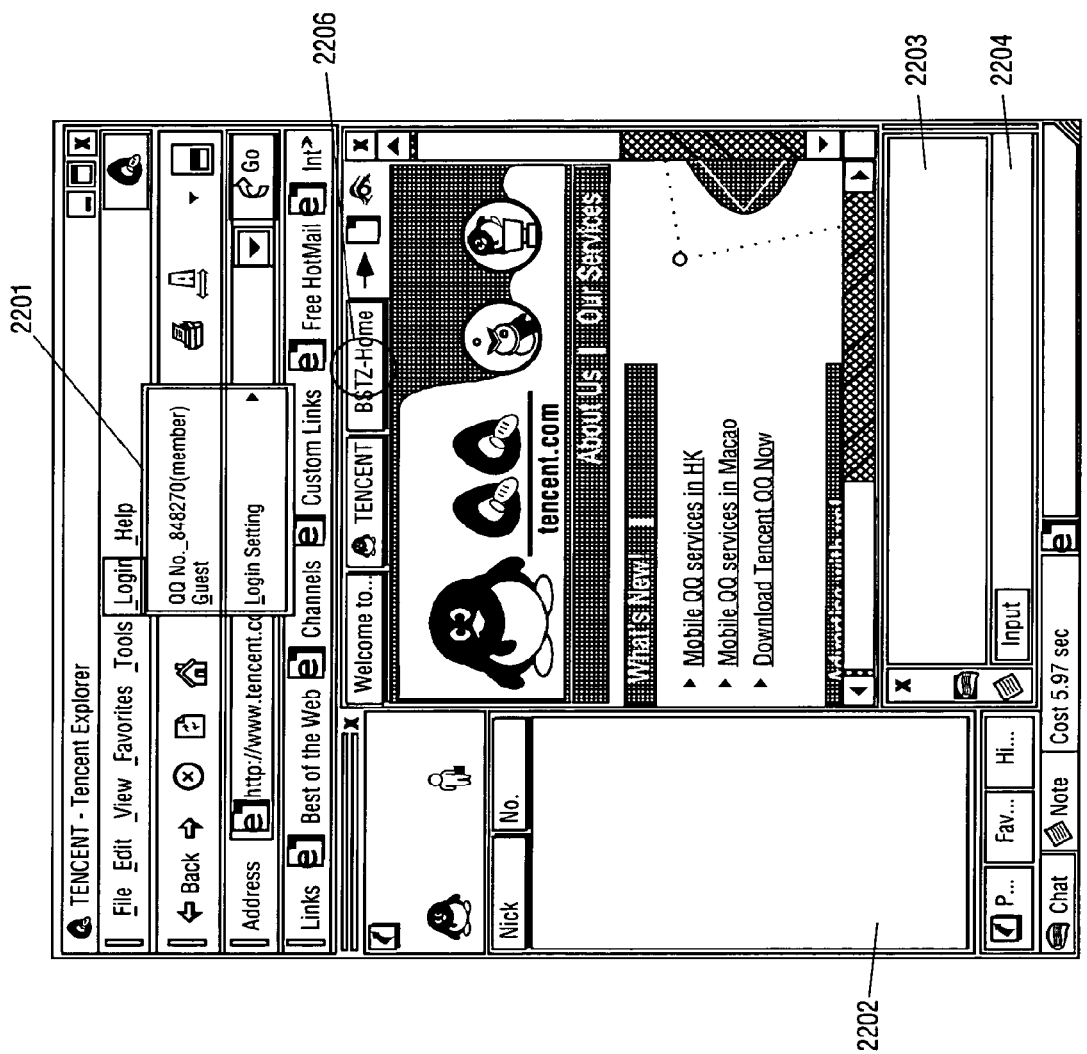
FIG. 22A shows a user interface of the Internet browser according to one embodiment of the invention.

As described above, before a user can use a browser to conduct instant messenger communication, the corresponding IM client must launch and log in to the system. The browser of the present invention also provides an option to log in to the instant messenger network from the browser, according to one embodiment of the invention. FIG. 22A shows a screen shot of an exemplary browser of the invention. The browser provides an option to log in from the menu 2201 to the IM server and receives the user IM information from the IM server. The browser also includes an option to display multiple users visiting the same page (e.g., www.tencent.com/english) in a window 2202 within the same instance of the browser. In addition, the browser also provides chatting services within the same browser, wherein the user can enter the texts in the input field 2204 and display the entire chatting messages in the window of 2203. It is important to note that all of the windows 2202, 2203, and 2204 are displayed within the same instance of the browser. Furthermore, the browser of the present invention is able to display multiple Web pages (e.g., www.tencent.com/english and www.bstz.com) on the same browser without launching another instance of the browser. A conventional browser displays multiple Web pages through launching multiple instances of the browser, each instance of the browser displays one Web page. The disadvantage of the conventional method is that it has to use substantial large system resources (e.g., memory) and each instance of the browser has to perform its own initialization processes upon being launched, which slows down the transactions. The present invention displays multiple Web pages within the same instance of the browser. Each Web page is associated with a page selector 2206. A user can display a specific Web page by selecting the page through the page selector 2206.

Figure 22B:
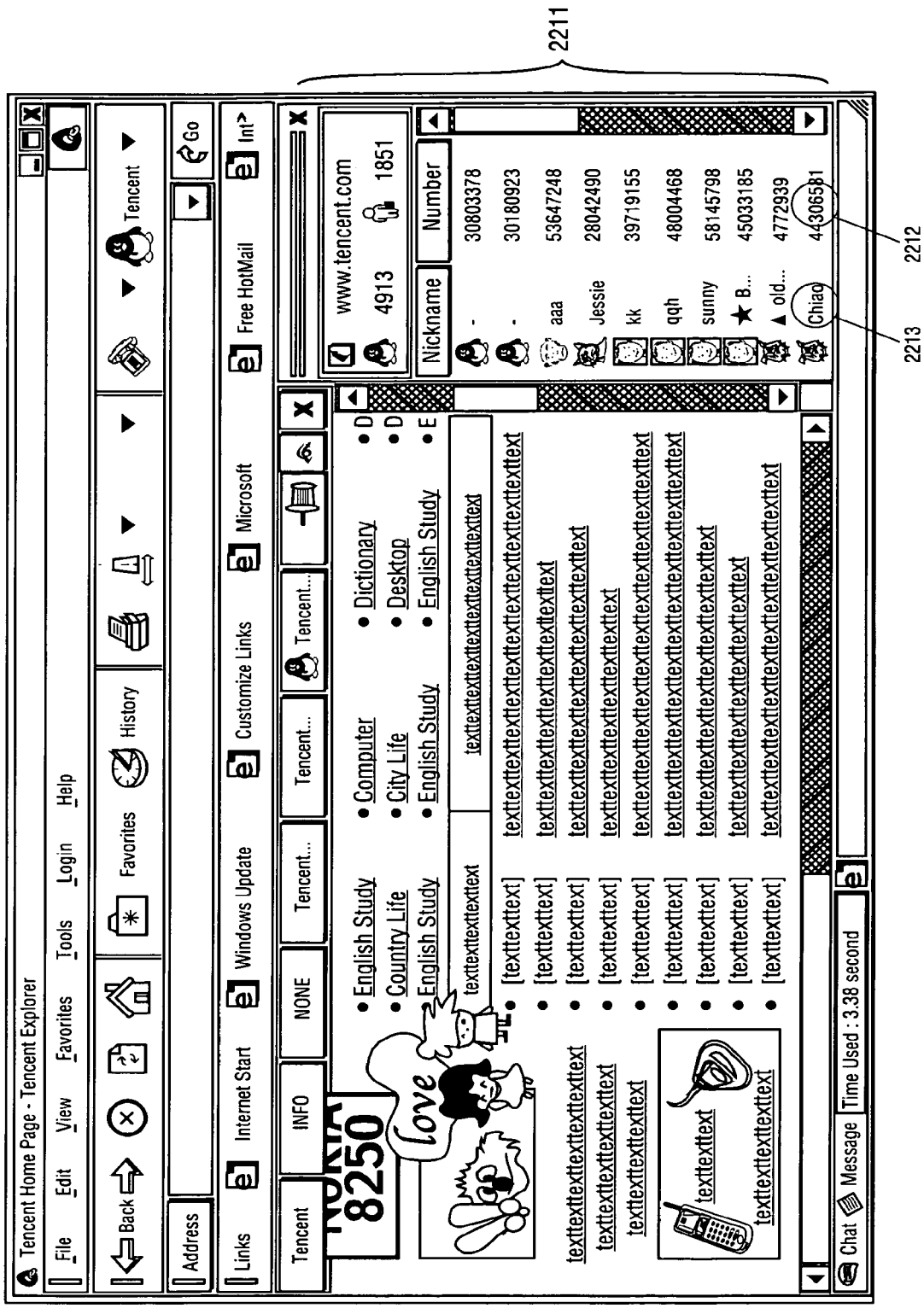
FIG. 22B shows a Chinese version of a user interface of the Internet browser according to one embodiment of the invention.

FIG. 22B shows an exemplary Chinese version of a browser of the present invention. The window 2211 is a user list window showing all of the users who have logged in to the system and are visiting the same selected Web page. The window 2211 contains each member's nickname 2213 and its corresponding logged in ID 2212. The user can chat with each one of the users listed in the window 2211 by selecting (e.g., clicking) on the nickname 2213 or ID 2212.

Figure 23:
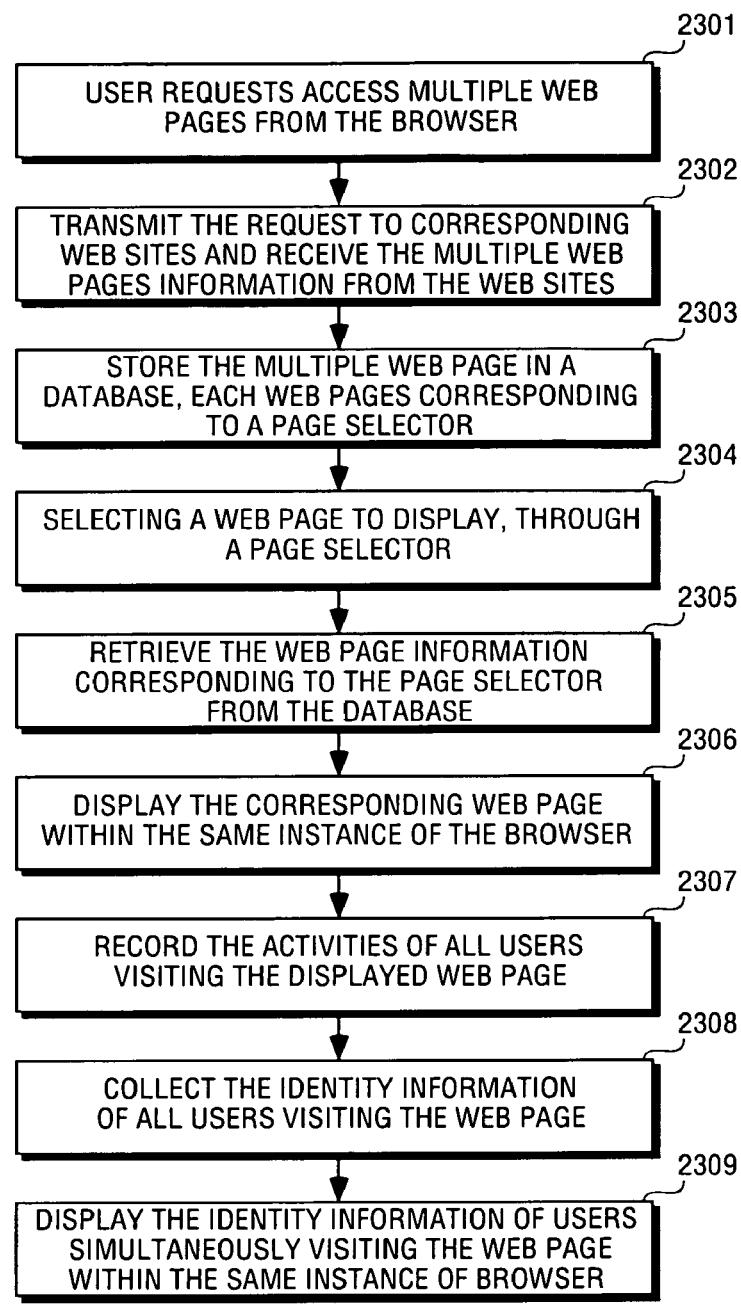
FIG. 23 shows a flowchart illustrating a method to display multiple Web pages within a single instance of a browser, according to an embodiment of the invention.

FIG. 23 shows a flowchart illustrating an exemplary method 2300 of displaying multiple Web pages in a single instance of the browser, according to one embodiment of the present invention. When the browser receives (block 2301) a request for accessing multiple Web pages from the user, the browser transmits (block 2302) the request to the appropriate Web sites. At the mean while, the browser may create a database categorized by each Web page being accessed. When the browser receives the Web pages information (e.g., in markup language documents), it stores (block 2303) the multiple Web pages information in the database, each Web page corresponding to a page selector (e.g., a Tab selector). The browser then selects (block 2304) a web page through a web page selector, normally the latest web page selected by the user, and retrieves (block 2305) the corresponding Web page information from the database. Then the browser displays (block 2306) the Web page within the same instance of the browser. Thereafter, the browser records the activities of the user and transfers this information down to the browser sever. The information may in turn be transferred to an analysis server for performing further statistical analysis on the data. At the mean while, the browser server collects (block 2308) identity information of all users visiting the same Web page and transmits this information to the browser client to display (block 2309) those identities of the users visiting the same Web page, within the same instance of browser.

Figure 24:
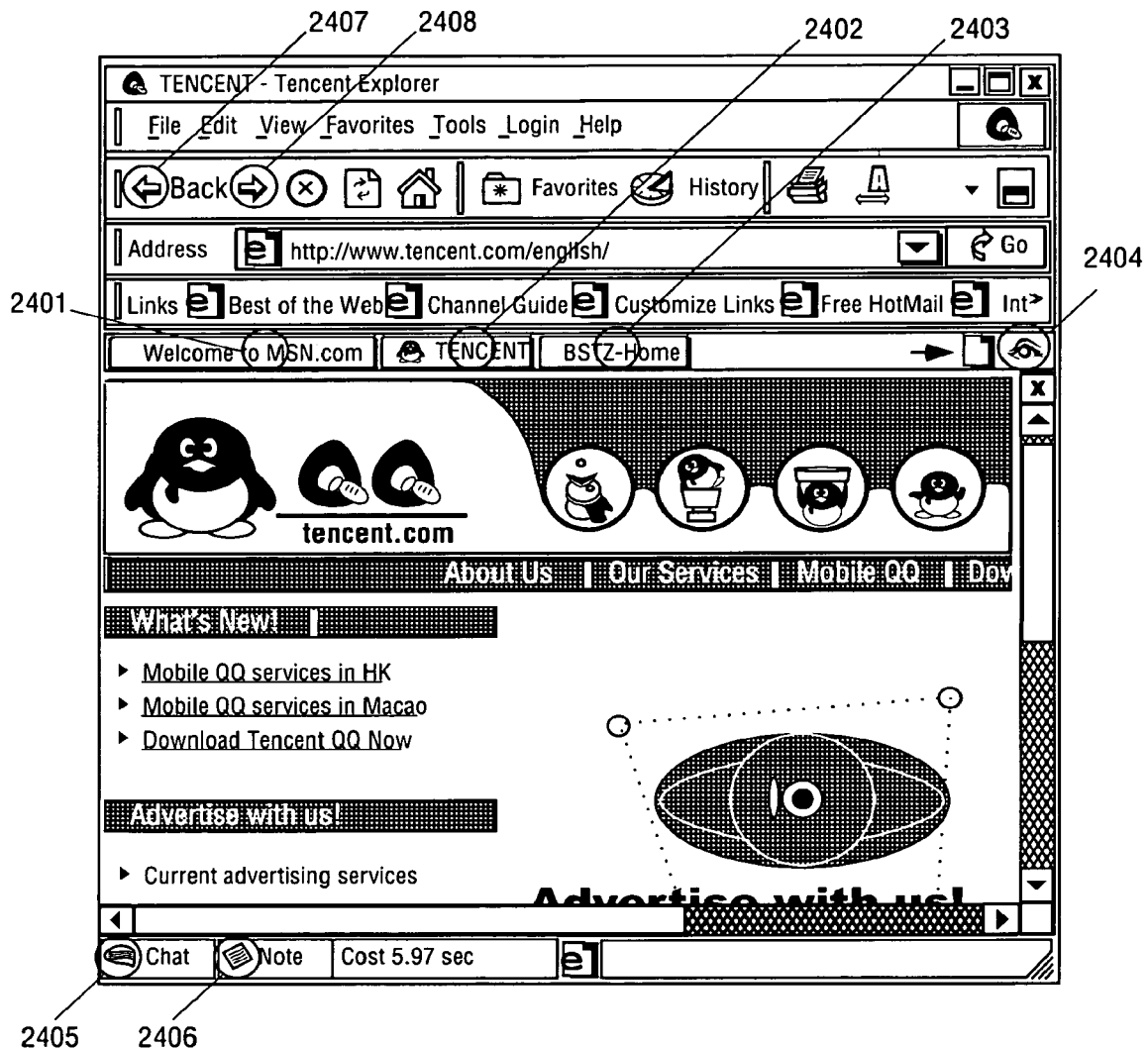
FIG. 24 shows an exemplary user interface of a browser capable of displaying multiple Web pages within the same single instance of the browser.

FIG. 24 is a screen shot of a browser being able to display multiple Web pages within the same instance of the browser, according to one embodiment of the present invention. As described above, the browser can display multiple Web pages within the same browser. Each Web page is associated with a Web page selector, such as page selectors 2401-2403. In one embodiment, the page selector is a Tab selector as shown in FIG. 24. In another embodiment, the page selector may be a button or a drop-down list. The advantage of the present invention is that since no multiple instances of the browsers are required to be launched, the invention uses less system resources (e.g., memory resources such as random access memory (RAM)). In addition, the browser has to perform certain initialization steps upon being launched. The present invention accordingly has faster speed in accessing a Web page without additional initialization processing. A Web page can be selected through the corresponding page selector (e.g., Tab selector). The browser always delivers the user's activity information, including the selected page indicator (e.g., page selector), to the browser server, such as browser server 2007 of FIG. 20A. The browser kernel server 2007 keeps track all the user's activities based on the selected page. In one embodiment, those information are stored in a database indexed based on the page selector. When the user selects a page through a page selector (e.g., clicking on the Tab selector), the browser passes the user's selection including the paged selected indicated by the corresponding page selector, to the browser server. The browser sever retrieves all of the web page information related to the page selector, including the markup language document, from the database and transfers back to the browser client.

In another embodiment, when the browser server receives the information on the page selected, the browser server returns the link to the corresponding Web page (e.g., the web address of the Web page), to the browser client. The browser retrieves the Web page (e.g., markup language document) from the corresponding Web sites, based on the link.

The browser client displays the Web page (e.g., markup language document) accordingly within the same browser. The browser sets the corresponding page selector, such as Tab selector 2402, as focused. On the other hand, all other unselected pages are defocused and their corresponding Web page information are not displayed or hidden. Each of the standard functional buttons, such as backward button 2407 and forward button 2408, perform according to the selected page. As a result, all of the history and forwarding pages of the selected page are preserved. These information, as well as other information performed by the standard functional buttons are also related to the selected page and may be stored in the database indexed based on the page selector, managed by the browser server.

The browser of the present invention also embodies instant communication functions, such as chatting and message board services. For example, the button 2404 will display a window (e.g., window 2202 of FIG. 22A) within the same browser, wherein the window will display all of other members who have logged in to the system visiting the same selected page. In addition, the chatting service may be launched within the browser through the button 2405. The chatting windows (e.g., windows 2203 and 2204 of FIG. 22A) may be launched through the button 2405. Similarly, the message board services can be launched from the browser through the button 2406.

Figure 25:
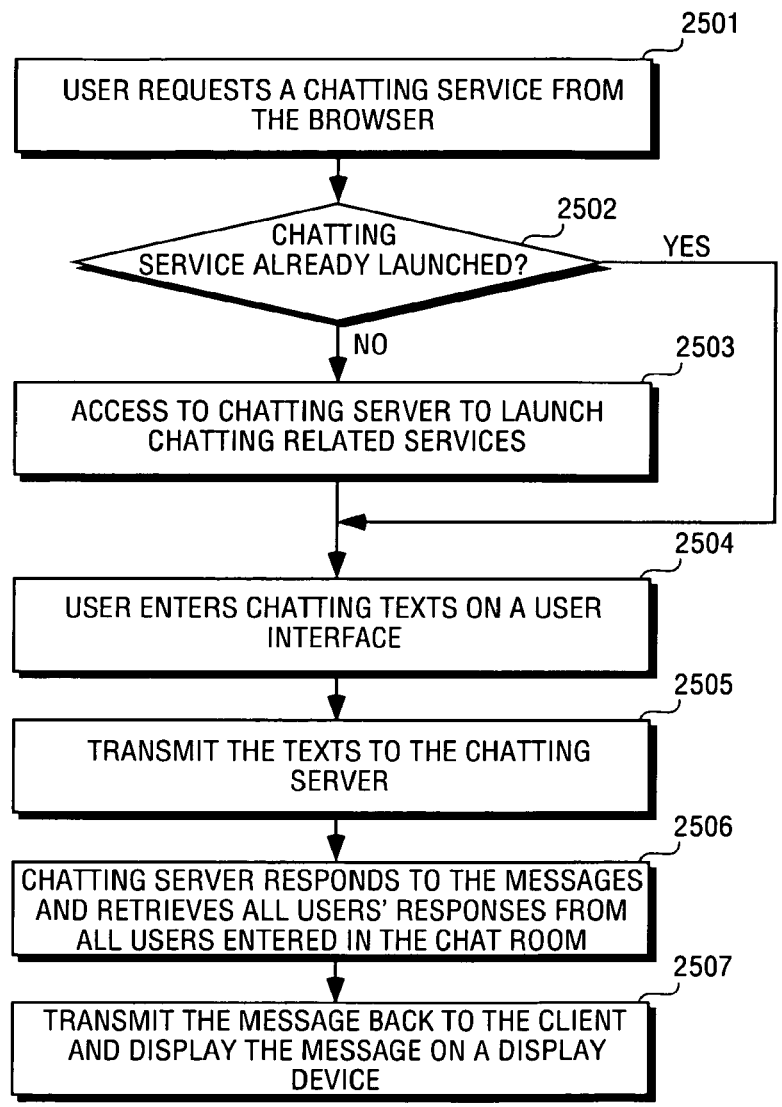
FIG. 25 shows a flowchart of illustrating chatting service provided by one embodiment of the invention.

FIG. 25 is a flowchart of conducting a chatting service, according to one embodiment of the present invention. When the user selects (block 2501) the chatting function, the system will check (block 2502) whether the chatting service has been launched. If the chatting service has not been launched, the browser chatting server will launch (block 2503) the chatting services and the browser client will display the chatting windows. Thereafter, the user can enter (block 2504) texts from an input field and the texts are then forwarded (block 2505) to the chatting server. The chatting server then communicates the message to all users who have entered the chat room and collects (block 2506) all responses from the users and returns (block 2507) to the originated user. In another embodiment, the chatting service may be launched from the instant messenger client, which is launched during the initialization of the PC.

Figure 26:
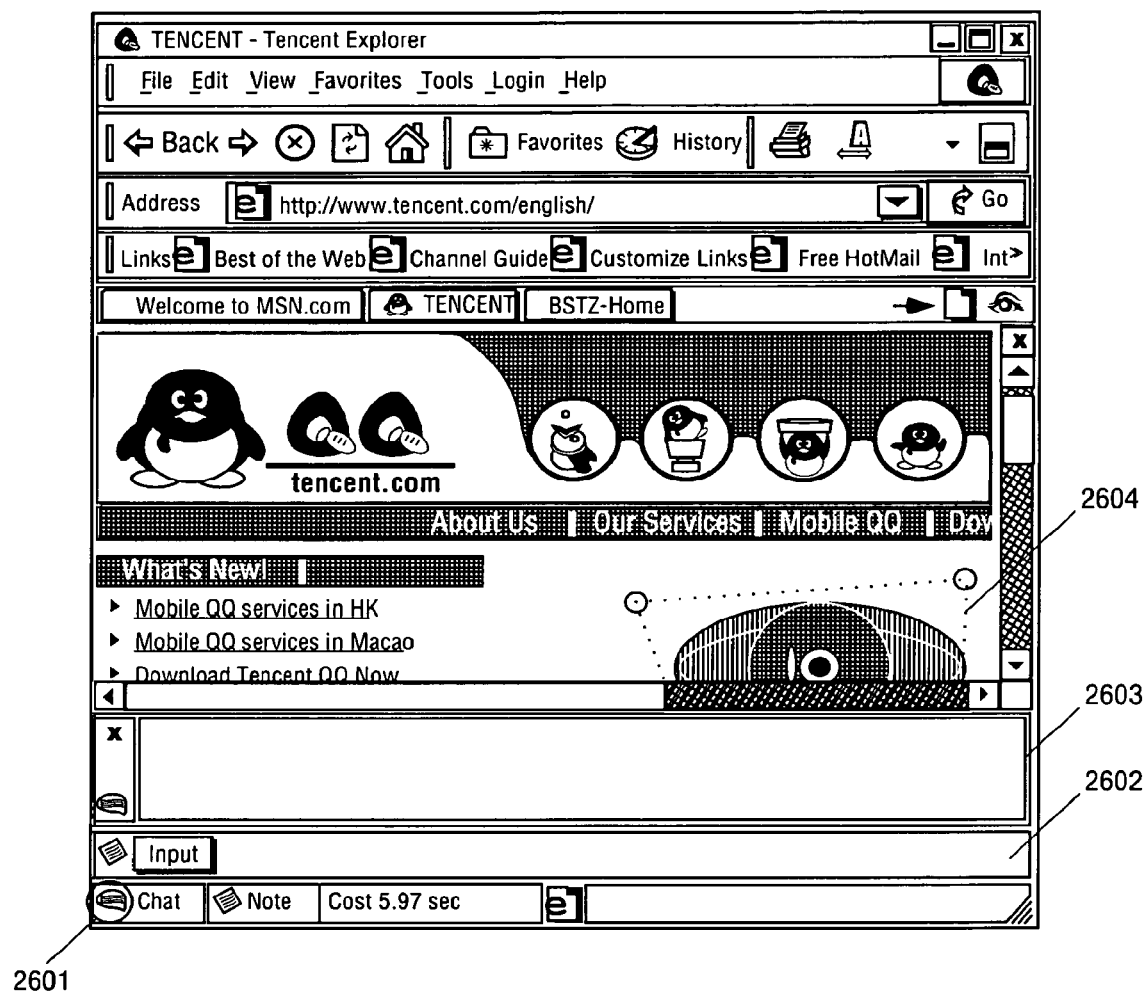
FIG. 26 shows a user interface of the chatting service of the invention.

FIG. 26 is a screen shot of a user interface of a chatting service, according to an embodiment of the present invention. The chatting service is launched within the same instance of the browser. Typically, the chatting windows are launched through a button 2601 from the browser. The chatting service can also be launched from the menu. The chatting service comprises an input field 2602 that a user can enter any chatting texts to the community. The texts entered by the user and by the members in the chatting room are shown in the window 2603. At the mean while, the user can browse multiple Web pages in the main window 2604. If the members in the chat room are visiting the same Web pages, they can use the chat room to discuss the information regarding to the same Web page they are visiting.

Figure 27:
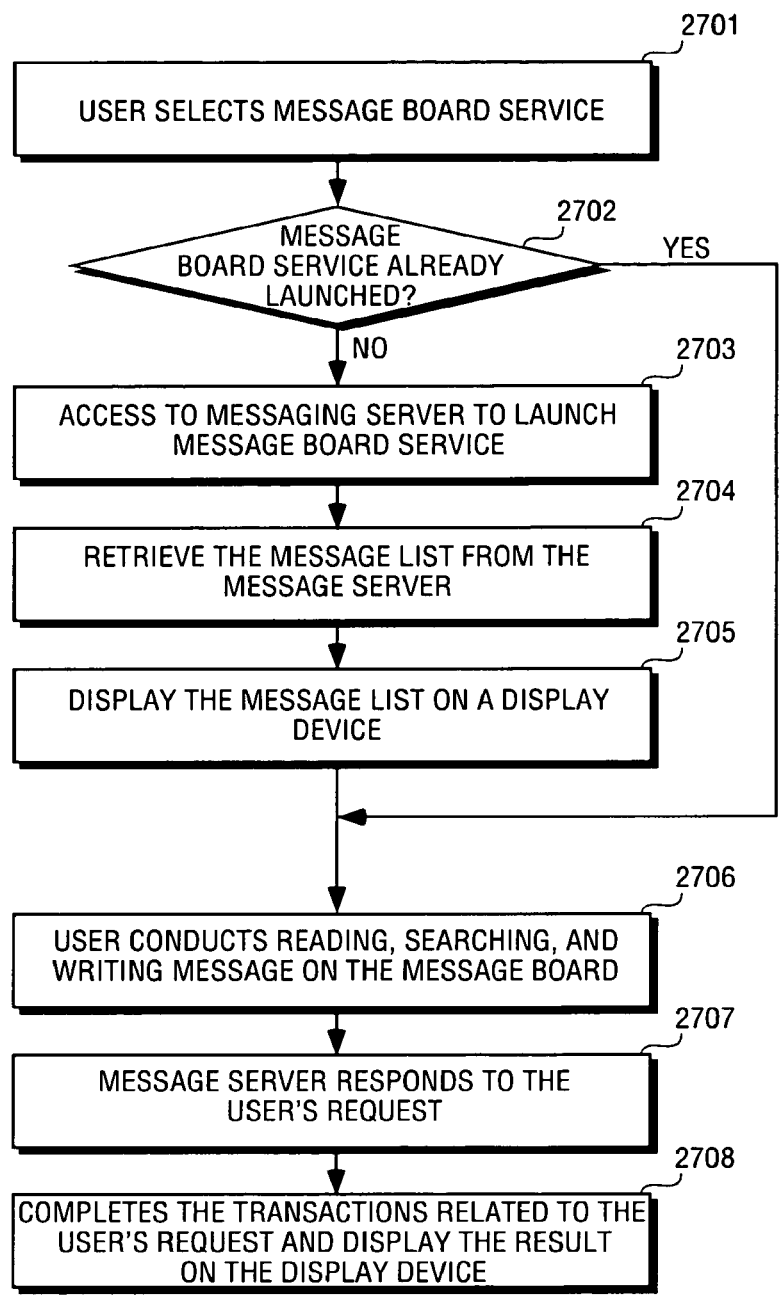
FIG. 27 shows a flowchart illustrating message board service provided by one embodiment of the invention.

FIG. 27 is a flowchart of a message board services, according to one embodiment of the present invention. When the message board service is launched (block 2701) by a user from the same instance of the browser, the browser checks (block 2702) whether such service has been launched. If the message board service has not been launched, the browser accesses (block 2703) the browser server group, such as the chatting and message server 2003 of the FIG. 20A. The browser then retrieves (block 2704) the message lists available and displays (block 2705) the message list in a window within the same instance of the browser. In block 2706, the user of the browser can then read from a message of the list, search for a message and send a message to the message board. The request from the user is then transmitted down to the server and the server responds (block 2707) to the request, and completes (block 2708) the related transaction and sends back the result to the browser.

Figure 28A:
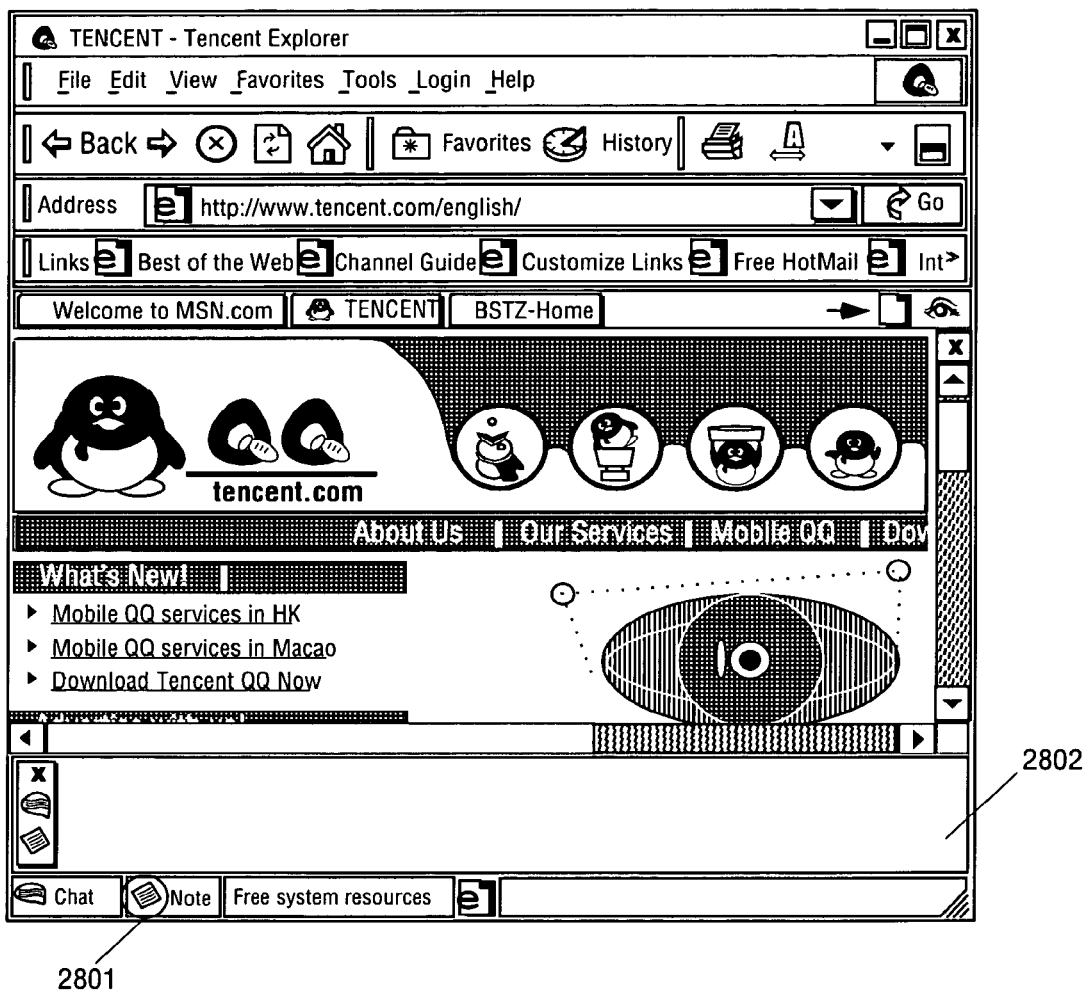
FIGS. 28A, 28B and 28C show user interfaces of message board service according to an embodiment of the invention.

FIG. 28A shows a user interface of the message board service, according to one embodiment of the present invention. The message board service can be launched from the button 2801 within the same instance of the browser. When the message board service is launched, a message board window 2802 will be displayed. The window normally contains all of the messages available, categorized by the interest topics within the community. One of the features of the message board service is that a user can leave a message or read a message to or from a friend while the friend may not necessarily be online. With the browser of the present invention, a user can leave a message regarding a Web page the user is visiting. On the other hand, a user also can read messages of others (e.g., comments on the shopping items of the Web page) who have visited the Web page, before committing to place a purchase order. Furthermore, an enterprise organization that hosts the Web page may use the information available on the message board to conduct marketing related research. In addition to the message board, a user or an enterprise organization can launch an instant messenger service, or a chatting service, to communicate with another user to discuss anything related to the Web page.

Figure 28B:
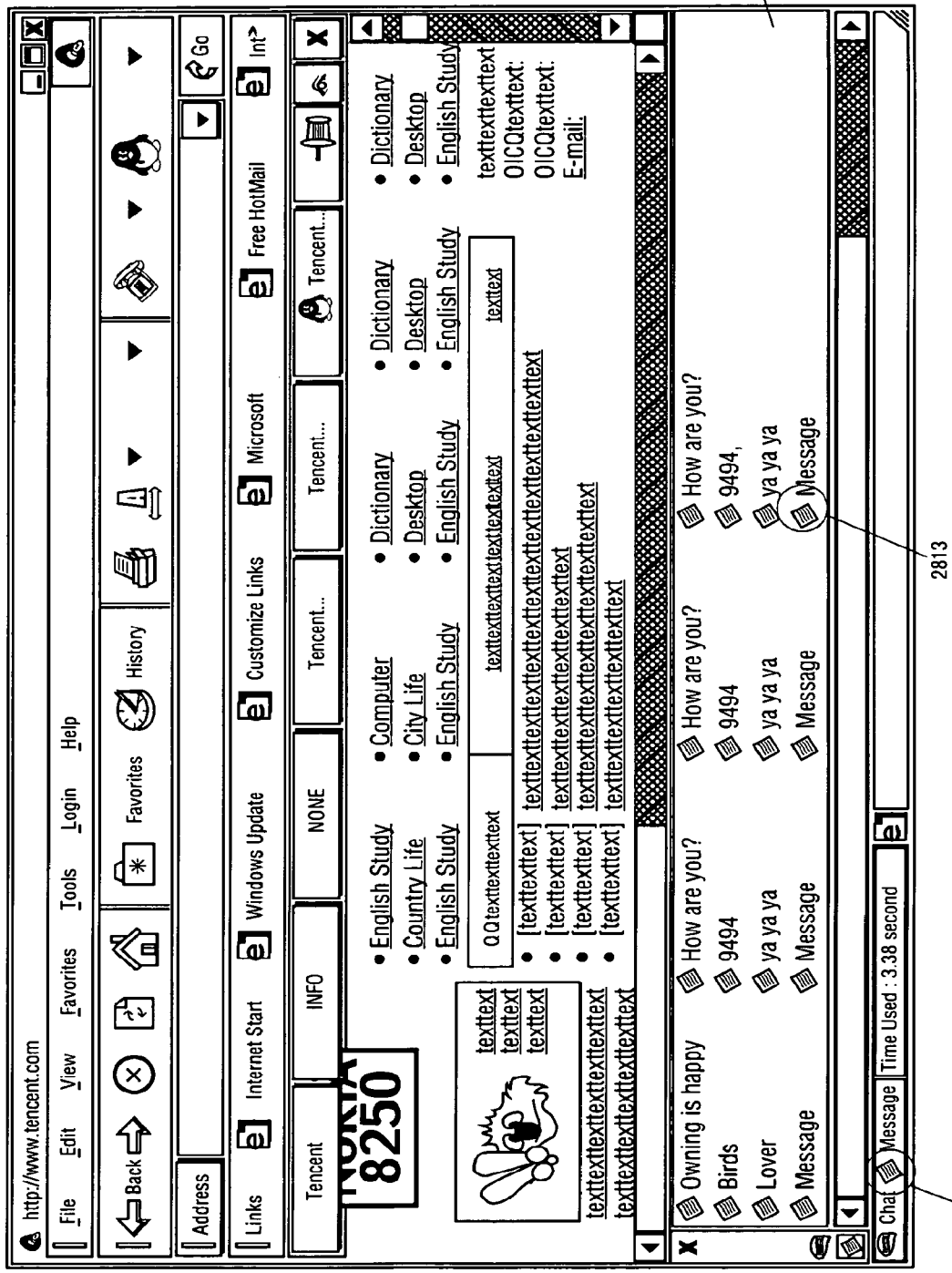
Figure 28C:
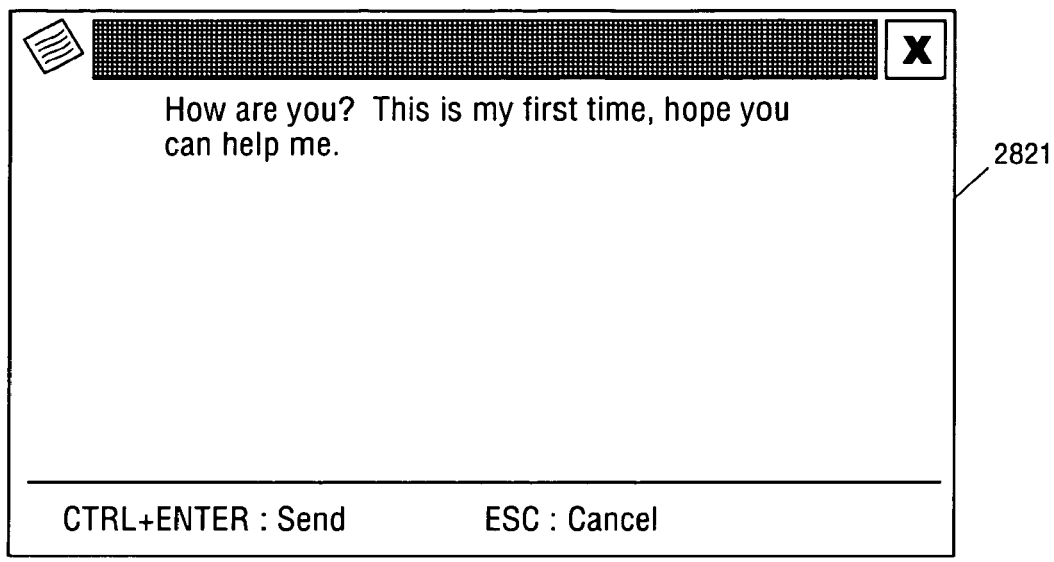
Figure 28C:
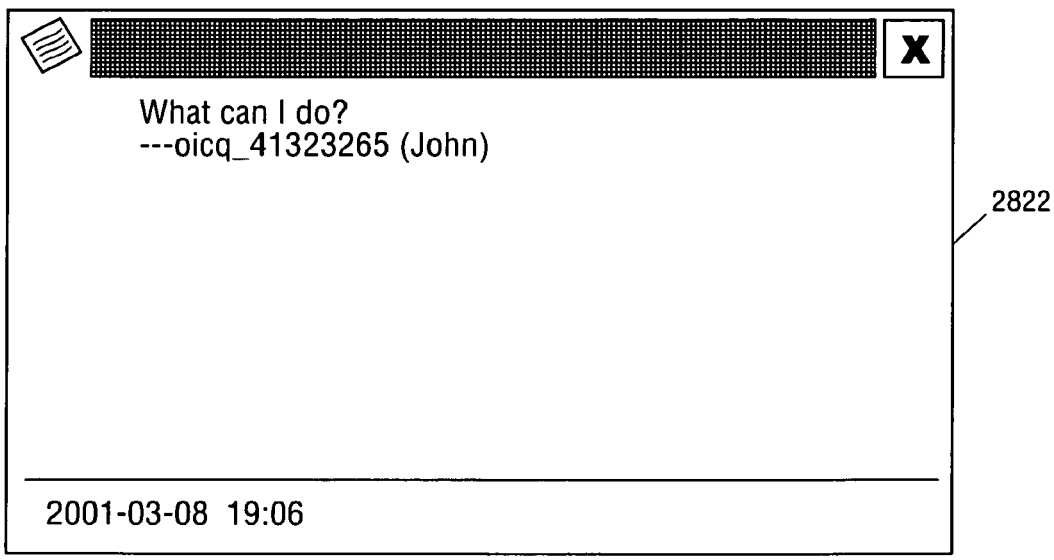

FIGS. 28B and 28C are corresponding Chinese version of the user interface with message board service, according one embodiment of the invention. Similarly, the message board service can be launched from a button 2811 and all messages available are shown in the window 2812. A user can select a message to read, such as message 2813. When a user selects a message, another message window 2822 will display the corresponding message. The user can also enter a message through an input field such as window 2821.

As described above, an embodiment of the browser is able to display multiple pages within the same instance of the browser. Each page may maintain the history list associated with the page. For example, a backward and forward buttons access the history list associated with the currently active page. The browser is also display multiple users who are visiting the same Web site or Web page within the browser, so called "Who's with me?" features. In fact, the "Who's with me?" window is associated with the currently active page (e.g., selected page). Thus, when the currently selected page is switched from one page to another, the information regarding the users displayed in the "Who's with me?" window are synchronized with the users who are visiting the new page. The "Who's with me?" window shows those who are visiting the new page, when the new page is switched from the previous one. Similarly, the chatting service and message board service are synchronized with the currently selected page. Thus, when the user switches from one Web site to another Web site, the chatting window shows all of the user currently entered the corresponding chat room related to the currently displayed Web site. In an alternative embodiment, the information regarding to the chat room are synchronized with the Web page currently displayed, even within the same domain of the sponsoring Web site. Similarly, the message board service may be synchronized with the current active Web page.

Figure 29:
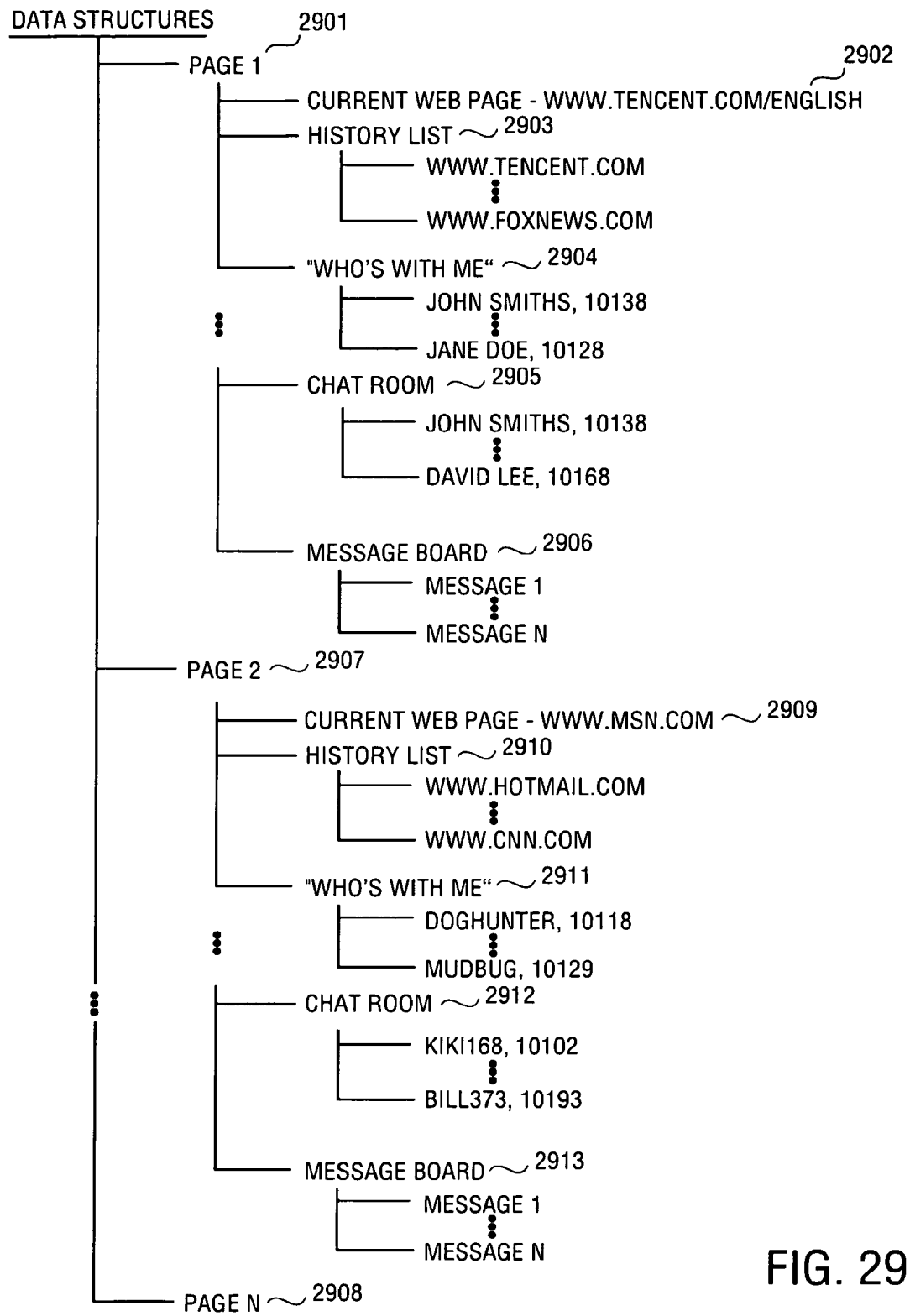
FIG. 29 shows an exemplary data structure used with one embodiment of the invention.

FIG. 29 shows an exemplary data structures of the browser according to one embodiment of the invention. The data structures may be stored in a storage location such as random access memory (RAM), or in a hard disk of a client. In alternative embodiment, these data structure may be stored in the browser server, such as browser server 2007 of FIG. 20A. Referring to FIG. 29, the data structure are grouped under each page, such as pages 2901, 2907, and 2908, currently displayed within the browser. The data structure corresponding to each page may be implemented as an object (e.g., class) using object oriented programming languages, such as C++ or Java. The data structure encapsulates all of the information related to the page under a corresponding data structure indexed by the page selector. For example, the data structure of page 2901 contains variety of information regarding to the corresponding page. Among them, the data structure may include the currently selected Web page address 2902, history list 2903, user list for "Who's with me?" 2904, users entered the chat room 2905, and message board 2906 on the corresponding Web site or Web page. Therefore, when a user selects page 2902, the browser will retrieve corresponding information regarding to the page 2902, such as current web page address 2902, history list 2903, etc. The browser then can display the Web page corresponding to the Web address 2902, which either has been cached previously or download the Web page from the Web address dynamically. Similarly, when the user switches from page 2901 to page 2902, the corresponding information, such as current Web address 2909 and history list 2910, etc. are retrieved and displayed on the browser.

It is important to note that all of the information related to a page are local information of the corresponding page. For example, the history list information containing previous activities of a user is stored based on the page selector. Unlike most of the conventional browser, which the history information is maintained globally per instance of browser, an embodiment of the present invention keeps track all of the user history of activities under each of the pages maintained by the browser simultaneously. Thus, history list of an inactive page (e.g., those not being selected) is stilled maintained by the browser. These information may be maintained by the browser client (e.g., stored in the RAM). In an alternative embodiment, these information may be stored in the browser server. When a page is selected, the history information corresponding to the selected page may be retrieved from the browser server. When a backward or forward button of the browser is pressed, the browser retrieves and displays the history information, and accesses the corresponding Web site upon user's selection. Similarly, other information such as the user list of the current chat room and message list of the message board corresponding to the selected Web site or selected Web page, are synchronized with the selected page. Other features of the browser may be implemented accordingly.

The present invention provides a unique browser that integrates most of the popular instant messenger communication mechanism into a single instance of browser. In addition, the present invention offers a browser that can display multiple Web pages within the same instance of the browser. As a result, the user interface is more user friendly and powerful. The invention also utilizes less system resources and provides a speed advantage. Although the invention can be used by an individual, it would be appreciated that the present invention may be adopted by an enterprise. Other features may be integrated with the browser.

A typical example of the browsing system of the invention may include a medium size network system. In the example of application, the network exchange adopts four 100M Ethernet exchanges. The system consists of 70 mainframes. Almost all servers adopt the form of cluster so as to achieve an even distribution of the dynamic state of the users. Some of the mainframes are used in the servers of the TIM service system while some in the Tencent browser server.

| Types of Mainframe | Number | Manufacturer |
| --- | --- | --- |
| Compaq PC Server Proliant 1850/3000 | 20 | Compaq |
| Powerleader PC Server Powerleade 3300R/4400R | 50 | Powerleader |
| 3Com 100M Switch 3Com 3C16980 | 4 | 3Com |
| Cisco Router Cisco 2501 | 3 | Cisco |
| DTU Newbridge 2603 Nokia B512 | 3 | Newbridge Nokia |

Main server models may include a browser server (cluster) with pl3300 p3/700*2 (two CPUs), browser chatting/messaging server (cluster) with pl4400 p3/866*2 (two CPUs), browser statistics management server: pl3300 p3/700*2 (two CPUs), IM server (cluster) with cpq1850 p3/700*4 (four CPUs). Products of Proliant series of Compaq's PC server system and the Power Leder PC server series of Intel may be chosen for the network server. Compaq Proliant 1850 is a competitive product in Proliant series severs in terms of its capability in calculation and the performance/price ratio. It can support the operation systems of open UNIX and Windows NT, especially suitable for use in those large applications involving database operation. 1850 adopts the PIII chips of 550 MHz as its CPU. It may be assembled with two CPUs at the utmost and may support multi-CPUs in symmetrical parallel processing (SMP).

Under the Linux Slackware 7 operating system, the largest 2 GB memory may be installed in the system. In this case, the server is installed a 1 GM memory. The purpose of using large capacity memory is to place several resources in the memory including the software of operating system, software of hot backup system and inquiry data commonly used in the application database in order to increase the central responding speed of the system. At the same time, all changes in the relevant database of the memory will be written back to the shared hard disk group as the source for keeping data information and recovery from failure. In addition, the memory has the ECC error correction feature and is able to carry out transition over the memory failure so that it is possible to prevent some important data from losing owing to the physical failure of the memory. 1850 adopts the form of modular assembly of easy installation and flexible configuration and the memory can be increased at any time as necessary.

The configuration of the hard disk in the mainframe system is divided into two parts. One is each mainframe has its own hard disk memory system and another is the periphery of the two mainframes share one hard disk memory system. The internal hard disk of a mainframe is mainly for placing the operating system software and database software system. Since the actual data will not be stored in the internal hard disk, the actual maximum hard disk capacity of 1850 reaches 27 GB. Disk array consists of four 3.5" half-height hard disks with red RAID 5 of 9 GB capacity that provides a 27 GB hard disk memory capacity.

The internal total linear velocity and I/O throughput speed are relatively fast. In the I/O facility, the server uses the technology of Smart Array to reduce the disk read /write and the 40 MBps SCSI interface to increase the data throughput capacity of the disk control and disk.

| Model | Configuration |
|---|---|
| Compaq 1850 (3U Rack) | |
| Compaq 1850 (3U Rack) | PIII 550 MHZ CPU (256K Cache) |
| | 1 GMB ECC RAM |
| | Four hot plug hard disk bays |
| | 9.1 GB (7200 RPM) HDD*4 |
| | Smart II/HD RAID |

This system uses twenty 1850 mainframes of the above configuration. Powerleader Rack-mount Server Series include an Inter IA Powerleader server composed of high performance server main board, processor, tailor-made frame, superior server management software and other parts certified by Inter and it is formed by assembly and testing of the production line. It possesses the following features of consistency, space for upgrading and being easy to manage. Assembly and maintenance is quick and easy, which facilitates upgrading of system performance in accordance with the need of business development. The Internet rack-mount server ingeniously designed by rack-mount server providers has utilized the structural modules of Inter-connection [custom] server, which is commonly used, reliable with high-speed expandability.

| Model | Configuration |
|---|---|
| PL3700R platform (2U Rack) | |
| PL3700R platform (2U Rack) | PIII 750 MHZ CPU (256K Cache) |
| | 128 MB ECC RAM |
| | 4 heated plugs hard diskette |
| | 9.1 GB (7200 RPM) HDD |
| Selected parts | |

This system has adopted 50 sets of the PL3300R main frame with the above configurations. Operating system may include Linux Slackware 7.x. In the UNIX products, Slackware7.1 has the features of good performance, high efficiency and module structure, and it leads in throughput and response speed. It has a number of advantages: a genuinely open computation environment can be set up by complying with the standard of UNIX system to protect the subscribers' investment in the operating system; high speed large-scale database accessibility; low-cost system, network and external storage management; to provide perfect system safety control system; to provide the most recent developing tools to help users develop application software at their convenience and in a speedy manner; to provide various technical means to help users complete the transfer among different systems and transplant of application software. The configuration may include database management system, such as mysql-3.22.27.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for displaying a status message of an instant messenger (IM) subscriber, the method comprising:
receiving, at a first mobile device, an input from a first IM subscriber, the input indicating information associated with a second IM subscriber;
processing, by the first mobile device, the input to identify an instant messenger identifier of the second IM subscriber;
formulating, by the first mobile device, a status request that includes the instant messenger identifier of the second IM subscriber;
sending, by the first mobile device, the status request to a mobile message center;
processing, by the mobile message center, information associated with the status request;
forwarding, by the mobile message center, information associated with the status request to a mobile network interface gateway;
forwarding, by the mobile network interface gateway, information associated with the status request to a mobile instant messenger server;
processing, by the mobile instant messenger server, information associated with the status request to identify the instant messenger identifier of the second IM subscriber included in the status request;
determining, by the mobile instant messenger server, whether the second IM subscriber is a mobile client based on at least information associated with the identified instant messenger identifier of the second IM subscriber;
if the second IM subscriber is determined to be a mobile client:
determining, by the mobile instant messenger server, a mobile identifier for the second IM subscriber based on at least information associated with the instant messenger identifier of the second IM subscriber, the mobile identifier being associated with a second mobile device; and
using, by the mobile instant messenger server, the mobile identifier to query a status of the second IM subscriber;
if the second IM subscriber is determined to not be a mobile client:
forwarding, by the mobile instant messenger server, information associated with the status request to a first instant messenger server;
using, by the first instant messenger server, information associated with the status request to query the status of the second IM subscriber; and
returning, by the first instant messenger server, the status of the second IM subscriber to the mobile instant messenger server;
returning, by the mobile instant messenger server, the status of the second IM subscriber to the mobile network interface gateway;

returning, by the mobile network interface gateway, the status of the second IM subscriber to the mobile message center;

returning, by the mobile message center, the status of the second IM subscriber;

receiving the status of the second IM subscriber based on at least information associated with the instant messenger identifier of the second IM subscriber;

examining the instant messenger identifier of the second IM subscriber to determine a characteristic of the second IM subscriber;

assigning a presence indicator to the second IM subscriber, the presence indicator representing the characteristic of the second IM subscriber;

displaying the status of the second IM subscriber on a display device of the first IM subscriber;

displaying the presence indicator corresponding to the second IM subscriber, the presence indicator sufficiently representing the characteristic of the second IM subscriber;

displaying at least one selected from a group consisting of a bright presence indicator and a special character, if the second IM subscriber is online; and displaying a dim presence indicator if the second IM subscriber is offline;

wherein the process of forwarding, by the mobile message center, information associated with the status request to a mobile network interface gateway includes sending short messages, by the mobile message center, to the mobile network interface gateway;

wherein if the second IM subscriber is determined to be a mobile phone subscriber, the presence indicator includes a graphic symbol indicating the second IM subscriber is a mobile phone subscriber;

wherein if the second IM subscriber is determined to be an enterprise organization, the presence indicator includes a logo image of the enterprise organization;

wherein the mobile instant messenger server is physically separate from the first instant messenger server.

2. The method of claim 1 wherein the mobile message center is a mobile short message center.

3. The method of claim 1 wherein the mobile identifier is a mobile phone number.

4. The method of claim 1, and further comprising:

displaying an online status if the second IM subscriber is online; and displaying an offline status if the second IM subscriber is offline.

* * * * *